US012659588B2

(12) United States Patent
Lee et al.

(10) Patent No.: US 12,659,588 B2
(45) Date of Patent: Jun. 16, 2026

(54) ACTUATOR FOR OPTICAL IMAGE STABILIZATION AND CAMERA MODULE INCLUDING THE SAME

(71) Applicant: SAMSUNG ELECTRO-MECHANICS CO., LTD., Suwon-si (KR)

(72) Inventors: Kyung Hun Lee, Suwon-si (KR); Jong Ho Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 489 days.

(21) Appl. No.: 18/073,936

(22) Filed: Dec. 2, 2022

(65) Prior Publication Data

US 2023/0188851 A1 Jun. 15, 2023

(30) Foreign Application Priority Data

Dec. 13, 2021 (KR) ........................ 10-2021-0177927
Oct. 17, 2022 (KR) ........................ 10-2022-0133457

(51) Int. Cl.
*H04N 23/68* (2023.01)
*G03B 5/00* (2021.01)
(Continued)

(52) U.S. Cl.
CPC ............. *H04N 23/687* (2023.01); *G03B 5/00* (2013.01); *H02K 41/0354* (2013.01);
(Continued)

(58) Field of Classification Search
None
See application file for complete search history.

(56) References Cited

U.S. PATENT DOCUMENTS 10,715,730 B1    7/2020  Xu et al.
10,890,734 B1    1/2021  Sharma et al.
(Continued)

FOREIGN PATENT DOCUMENTS

CN           111555537 A    8/2020
KR    10-2015-0051098 A    5/2015
(Continued)

OTHER PUBLICATIONS

Korean Office Action issued on Jul. 1, 2024, in counterpart Korean Patent Application No. 10- 2022-0133457 (6 pages in English, 5 pages in Korean).
(Continued)

*Primary Examiner* — Paul M Berardesca
(74) *Attorney, Agent, or Firm* — NSIP Law

(57) ABSTRACT

An optical image stabilization actuator includes a fixed frame having an internal space, a moving frame accommodated in the fixed frame and being movable relative to the fixed frame, a first ball member disposed between the fixed frame and the moving frame, a first driving unit including a plurality of magnets disposed in the fixed frame and a plurality of coils disposed in the moving frame and moved together with the moving frame, a sensor substrate partially coupled to the moving frame to move together with the moving frame, a plurality of yokes disposed in the moving frame and generating attractive force with respect to the plurality of magnets, and an image sensor disposed in a portion of the sensor substrate.

26 Claims, 40 Drawing Sheets

1

(51) Int. Cl.

| | | |
|---|---|---|
| *H02K 41/035* | (2006.01) | |
| *H04N 23/51* | (2023.01) | |
| *H04N 23/54* | (2023.01) | |
| *H04N 23/55* | (2023.01) | |
| *H04N 23/57* | (2023.01) | |

(52) U.S. Cl.

CPC ............ *H04N 23/51* (2023.01); *H04N 23/54* (2023.01); *H04N 23/55* (2023.01); *H04N 23/57* (2023.01); *G03B 2205/0069* (2013.01)

(56) References Cited

U.S. PATENT DOCUMENTS

| | | | | |
|---|---|---|---|---|
| 12,219,256 B1 * | 2/2025 | Patel | ..................... | H04N 23/54 |
| 12,231,753 B1 * | 2/2025 | Sommer | ................ | H04N 23/67 |
| 2017/0155847 A1 * | 6/2017 | Ito | ........................ | F16M 13/022 |
| 2017/0244898 A1 * | 8/2017 | Shintani | ................ | H02K 41/02 |
| 2018/0115715 A1 | 4/2018 | Jung et al. | | |
| 2019/0141248 A1 | 5/2019 | Hubert et al. | | |
| 2020/0106962 A1 | 4/2020 | Smyth et al. | | |
| 2020/0228710 A1 * | 7/2020 | Awazu | ................... | H04N 23/54 |
| 2021/0218896 A1 * | 7/2021 | Smyth | ................... | H04N 23/67 |
| 2021/0223662 A1 | 7/2021 | Miller et al. | | |
| 2021/0258491 A1 * | 8/2021 | Park | ....................... | H04N 23/57 |
| 2022/0014677 A1 * | 1/2022 | Smyth | ..................... | G02B 7/09 |
| 2022/0082785 A1 * | 3/2022 | Liu | ........................ | H04N 23/55 |
| 2022/0353416 A1 * | 11/2022 | Kwon | ................ | H04N 23/687 |
| 2023/0023813 A1 | 1/2023 | Oh | | |
| 2023/0156310 A1 * | 5/2023 | Jang | .................. | H04N 23/6812 |
| | | | | 348/208.2 |
| 2023/0156328 A1 * | 5/2023 | Jang | ................... | H04N 23/675 |
| | | | | 348/349 |
| 2023/0156333 A1 * | 5/2023 | Jang | ...................... | G02B 26/00 |
| | | | | 348/208.7 |
| 2023/0156334 A1 * | 5/2023 | Jang | ......................... | H01F 7/20 |
| | | | | 348/208.7 |
| 2023/0156335 A1 * | 5/2023 | Jang | ...................... | H04N 23/55 |
| | | | | 348/208.99 |
| 2023/0209198 A1 * | 6/2023 | Lee | ...................... | H04N 23/687 |
| | | | | 348/208.11 |
| 2023/0221574 A1 * | 7/2023 | Kim | ................... | H04N 23/6812 |
| | | | | 396/55 |
| 2023/0418086 A1 * | 12/2023 | Wang | ................... | G02B 27/646 |
| 2024/0040253 A1 * | 2/2024 | Min | ...................... | H04N 23/54 |
| 2024/0080561 A1 * | 3/2024 | Lee | ........................ | H04N 23/57 |
| 2025/0097577 A1 * | 3/2025 | Brown | ............... | F03G 7/06143 |

FOREIGN PATENT DOCUMENTS

| | | | |
|---|---|---|---|
| KR | 10-1804921 B1 | | 1/2018 |
| KR | 10-2018-0135392 A | | 12/2018 |
| KR | 10-2020-0139109 A | | 12/2020 |
| KR | 10-2021-0081556 A | | 7/2021 |
| KR | 20220145735 A | * | 10/2022 |
| WO | WO2020/120998 A2 | | 6/2020 |

OTHER PUBLICATIONS

Wang, Jeremy H-S., et al., "Control Design and Digital Implementation of a Fast 2-Degree-of-Freedom Translational Optical Image Stabilizer for Image Sensors in Mobile Camera Phones", Sensors, Oct. 13, 2017, (18 Pages in English).

Indian Office Action Issued on Aug. 8, 2025, in Counterpart Indian Patent Application No. 202214070933 (8 Pages in English and 6 Pages in Hindu).

Chinese Office Action issued on Aug. 30, 2025, in counterpart Chinese Patent Application No. 202211604021.5 (9 pages in English, 21 pages in Chinese).

* cited by examiner

10

Ⅲ－Ⅲ'

ACTUATOR FOR OPTICAL IMAGE STABILIZATION AND CAMERA MODULE INCLUDING THE SAME

CROSS-REFERENCE TO RELATED APPLICATIONS

This application claims the benefit under 35 USC 119(a) of Korean Patent Application No. 10-2021-0177927 filed on Dec. 13, 2021, and Korean Patent Application No. 10-2022-0133457 filed on Oct. 17, 2022, in the Korean Intellectual Property Office, the entire disclosures of which are incorporated herein by reference for all purposes.

BACKGROUND

1. Field

The present disclosure relates to an actuator for optical image stabilization and a camera module including the same.

2. Description of the Background

Camera modules may be employed in mobile communications terminals, such as smartphones, tablet PCs, and notebook computers.

In addition, camera modules may be provided with an actuator having a focus adjustment function and an optical image stabilization function in order to generate high-resolution images.

For example, the focus may be adjusted by moving a lens module in an optical axis (a Z-axis) direction, or shake may be corrected by moving the lens module in a direction perpendicular to the optical axis (the Z-axis).

However, due to the influence of weight of a driving unit for moving the lens module, precisely controlling driving force for optical image stabilization may be difficult.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical image stabilization actuator includes a fixed frame having an internal space, a moving frame accommodated in the fixed frame and being movable relative to the fixed frame, a first ball member disposed between the fixed frame and the moving frame, a first driving unit including a plurality of magnets disposed in the fixed frame and a plurality of coils disposed in the moving frame and moved together with the moving frame, a sensor substrate partially coupled to the moving frame to move together with the moving frame, a plurality of yokes disposed in the moving frame and generating attractive force with respect to the plurality of magnets, and an image sensor disposed in a portion of the sensor substrate.

Other portions of the sensor substrate may be coupled to the fixed frame.

The moving frame may include a first frame in which the plurality of coils may be disposed and a second frame in which the first ball member may be disposed.

The first frame and the second frame may be formed of a plastic material.

A wiring pattern may be disposed inside of the moving frame, and a portion of the wiring pattern may be connected to the plurality of coils.

Another portion of the wiring pattern may be exposed to the outside of the second frame and connected to the sensor substrate.

A wiring pattern may be disposed inside of the first frame and inside the second frame, a portion of the wiring pattern may be exposed to the outside of the first frame, and another portion of the wiring pattern may be exposed to the outside of the second frame.

The plurality of yokes may face the plurality of magnets, and at least a portion of each of the plurality of yokes may be disposed inside of the first frame.

A support pad may be disposed inside of the second frame, and one surface of the support pad may be exposed to the outside of the second frame to contact the first ball member.

The second frame may be formed of a plastic material, and the support pad may be formed of a non-magnetic metal material.

The first driving unit may include a first sub-driving unit generating driving force in a first axis direction parallel to an imaging surface of the image sensor and a second sub-driving unit generating driving force in a second axis direction perpendicular to the first axis direction, the first sub-driving unit may include a first magnet disposed in the fixed frame and a first coil disposed in the moving frame, and the second sub-driving unit may include a second magnet disposed in the fixed frame and a second coil disposed in the moving frame.

One or more of the first magnet and the second magnet may include two magnets, one or more of the first coil and the second coil may include two coils, and two position sensors may be disposed at positions facing the two magnets.

The sensor substrate may include a moving portion, on which the image sensor may be disposed, coupled to the moving frame, a fixed portion coupled to the fixed frame, and a connection portion connecting the moving portion and the fixed portion, and the connection portion may be extended along a circumference of the moving portion.

The connection portion may include a plurality of bridge elements spaced apart from each other, and each bridge element may have a width less than a thickness thereof.

The connection portion may include a first support portion and a second support portion, the first support portion may have one side connected to the moving portion and the other side spaced apart from the fixed portion, and the second support portion may have one side connected to the fixed portion and the other side spaced apart from the moving portion.

The moving frame may include a plurality of damping recesses, the fixed frame may include a plurality of damping pins extending toward the plurality of damping recesses, and a damping gel may be disposed in the plurality of damping recesses, and at least a portion of the plurality of damping pins may be inserted into the damping gel.

A camera module may include the actuator, and a lens module accommodated in an internal space of a housing and disposed to be movable in an optical axis direction, wherein the housing is disposed on the fixed frame.

In another general aspect, a camera module includes: a housing having an internal space, a lens module accommodated in the internal space and disposed to be movable in an optical axis direction, a fixed frame fixedly disposed on the housing, a moving frame movable in a direction perpendicular to the optical axis direction, relative to the fixed frame, a first ball member disposed between the fixed frame and the moving frame, a first driving unit including a plurality of magnets disposed in the fixed frame and a plurality of coils disposed in the moving frame and moved together with the moving frame, and a sensor substrate, on which an image sensor is disposed, having a moving portion coupled to the moving frame, wherein the plurality of coils and the sensor substrate are electrically connected by a wiring pattern disposed inside of the moving frame.

The sensor substrate may include a fixed portion coupled to the fixed frame.

The wiring pattern may include a wiring portion connected to the plurality of coils and a terminal portion connected to the sensor substrate, a portion of the wiring portion may be exposed to an upper surface of the moving frame, and the rest of the wiring portion may be disposed inside of the moving frame, and the terminal portion may be exposed to a lower surface of the moving frame.

The lens module may include a first guide portion protruding in the optical axis direction, the housing may include a second guide portion protruding in the optical axis direction and accommodating the first guide portion, and a second ball member may be disposed between surfaces of the first guide portion and the second guide portion facing in a direction perpendicular to the optical axis direction.

The fixed frame may include a step portion in which the second guide portion may be disposed.

In another general aspect, an optical image stabilization actuator includes a fixed frame open from top to bottom, an image sensor receiving incident light through the fixed frame, and disposed in a movable frame being movable relative to the fixed frame in a first direction parallel to the plane of the image sensor and a second direction perpendicular to the first direction, magnets disposed on the fixed frame extending in the first direction and the second direction, coils disposed in the moving frame facing the magnets to drive the moving frame in the first and second directions, wherein the movable frame is disposed on a first ball member disposed between the movable frame and the fixed frame.

The coils disposed in the moving frame facing the magnets may rotate the moving frame about a direction the image sensor faces.

The image sensor may be disposed on a sensor substrate, and the sensor substrate may include a moving portion, on which the image sensor is disposed, coupled to the moving frame, a fixed portion coupled to the fixed frame, and a connection portion connecting the moving portion and the fixed portion.

The actuator may further include yokes disposed in the moving frame and generating attractive force with respect to the magnets.

A camera module may include the actuator, a sensor substrate including a moving portion, on which the image sensor is disposed, coupled to the moving frame, a fixed portion coupled to the fixed frame, and a connection portion connecting the moving portion and the fixed portion, and a lens module accommodated in an internal space of a housing and disposed to be movable in an optical axis direction to focus the incident light on the image sensor, wherein the housing may be disposed on the fixed frame, and wherein the coils and the sensor substrate may be electrically connected by a wiring pattern disposed inside of the moving frame.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
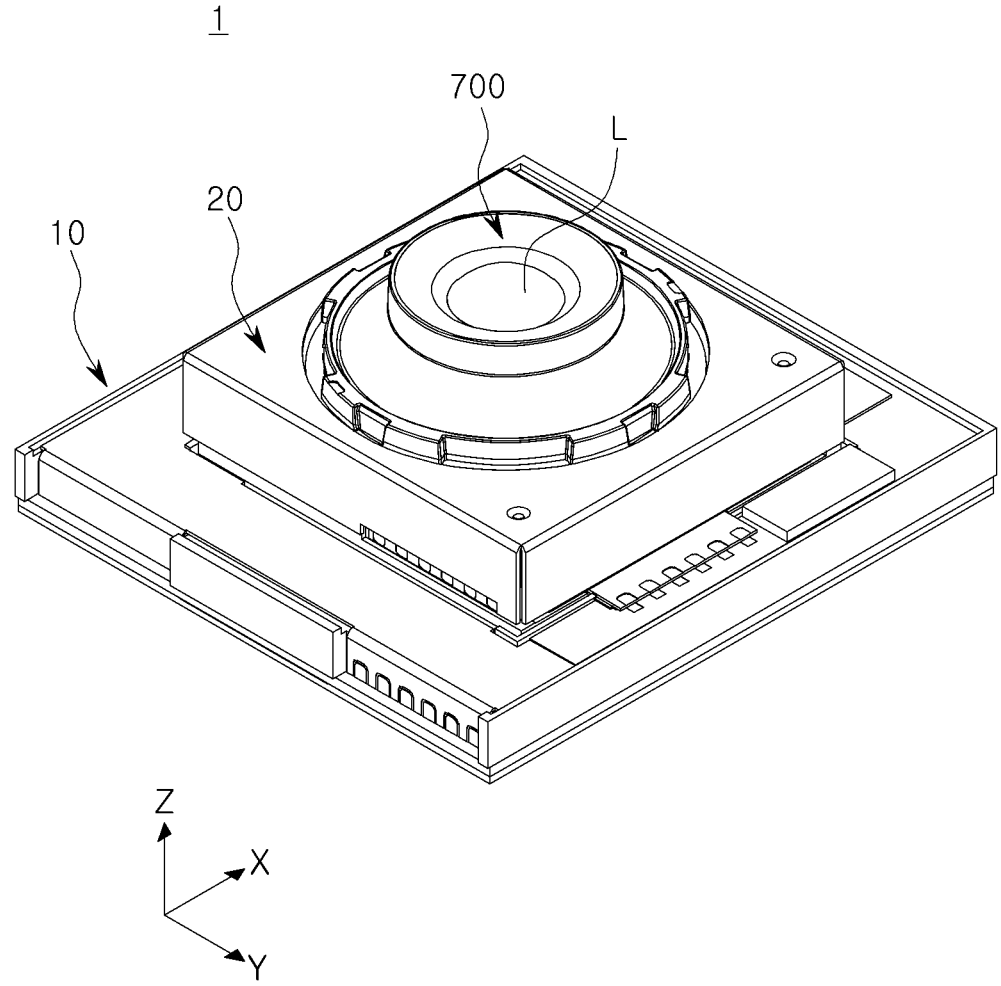
FIG. 1 is a perspective view of a camera module according to an example embodiment in the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide an actuator for optical image stabilization capable of improving optical image stabilization performance and a camera module including the same.

Figure 2:
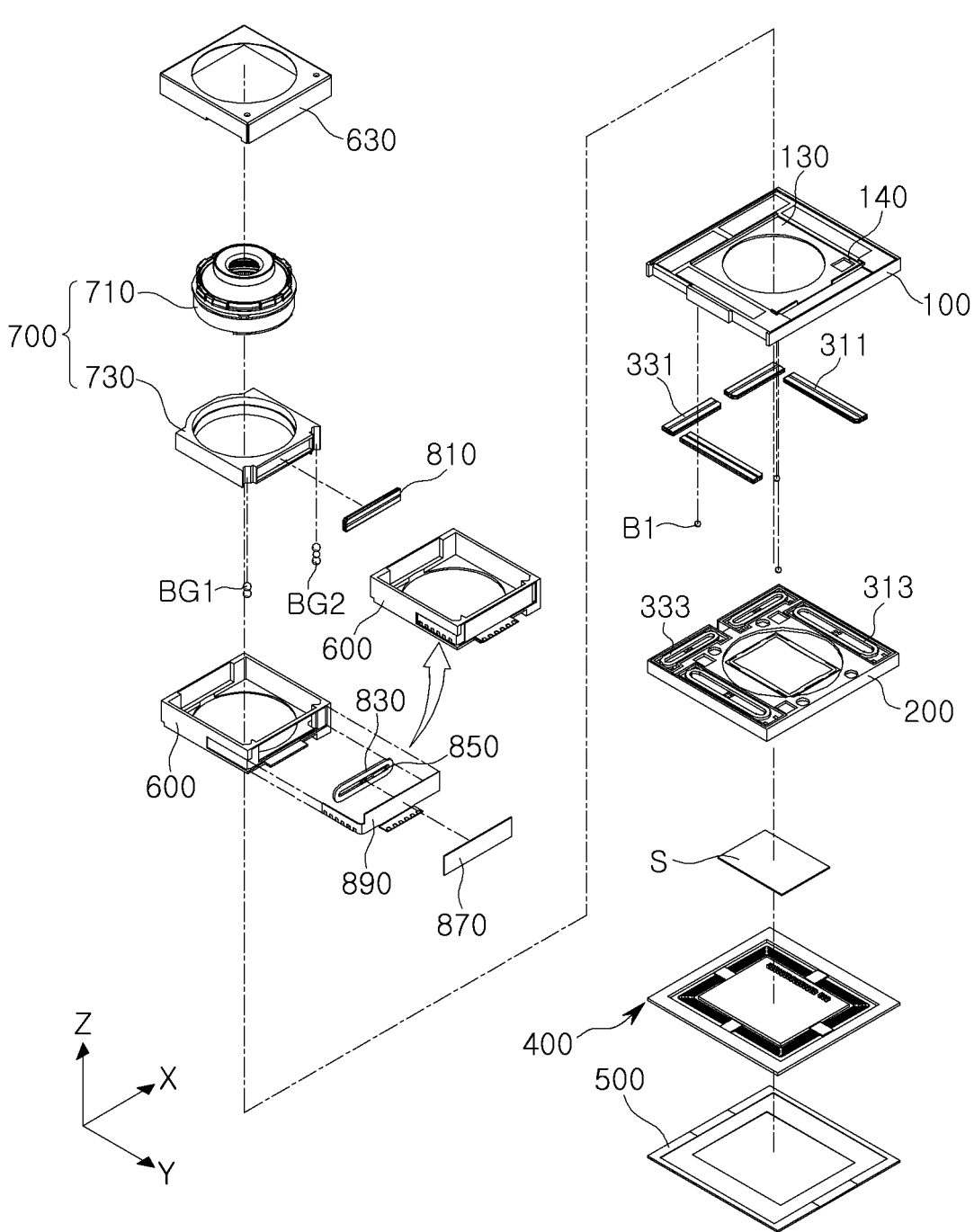
FIG. 2 is a schematic exploded perspective view of a camera module according to an example embodiment in the present disclosure.

FIG. 1 is a perspective view of a camera module according to an example embodiment in the present disclosure, and FIG. 2 is a schematic exploded perspective view of a camera module according to an example embodiment in the present disclosure.

An actuator for optical image stabilization according to an example embodiment in the present disclosure and a camera module including the same may be mounted on a portable electronic device. The portable electronic device may be a mobile communication terminal, a smartphone, a tablet PC, or the like.

Referring to FIGS. 1 and 2, a camera module 1 according to an example embodiment in the present disclosure includes a lens module 700, an image sensor S, a first actuator 10 and a second actuator 20.

The first actuator 10 is an actuator for optical image stabilization, and the second actuator 20 is an actuator for focus adjustment.

The lens module 700 includes at least one lens L and a lens barrel 710. At least one lens L is disposed inside of the lens barrel 710. When a plurality of lenses L are provided, the plurality of lenses L are mounted inside the lens barrel 710 along an optical axis (a Z-axis).

The lens module 700 may further include a carrier 730 coupled to the lens barrel 710.

The carrier 730 may have a hollow portion penetrating through the carrier 730 in the optical axis (Z-axis) direction, the lens barrel 710 is inserted into the hollow portion to be fixed with respect to the carrier 730.

In one example embodiment in the present disclosure, the lens module 700 is a moving member moved in the optical axis (Z-axis) direction during autofocusing (AF). To this end, the camera module 1 according to an example embodiment in the present disclosure includes the second actuator 20.

The lens module 700 may be moved in the optical axis (Z-axis) direction by the second actuator 20 to adjust the focus.

Meanwhile, the lens module 700 is a fixed member that does not move during optical image stabilization.

The camera module 1 according to an example embodiment in the present disclosure may perform optical image stabilization (OIS) by moving the image sensor S, instead of the lens module 700. Since the relatively light image sensor S is moved, the image sensor S may be moved with a smaller driving force. Accordingly, OIS may be performed more precisely.

To this end, the camera module 1 according to an example embodiment in the present disclosure includes the first actuator 10.

The image sensor S may be moved in a direction perpendicular to the optical axis (the Z-axis) or rotated based on the optical axis (the Z-axis) as a rotation axis by the first actuator 10 to perform OIS.

That is, by the first actuator 10, the image sensor S may be moved in a direction perpendicular to a direction in which an imaging surface of the image sensor S faces. For example, the image sensor S may be moved in a direction perpendicular to the optical axis (the Z-axis) or rotated based on the optical axis (the Z-axis) as a rotation axis to perform OIS.

In this specification, the direction in which the imaging surface of the image sensor S faces may be referred to as an optical axis (Z-axis) direction. That is, the image sensor S may move in a direction perpendicular to the optical axis (the Z-axis).

In the drawings of this specification, when the image sensor S moves in a direction parallel to the imaging surface, it may be understood that the image sensor S moves in a direction perpendicular to the optical axis (the Z-axis).

In addition, when the image sensor S moves in a first axis direction (an X-axis direction) or a second axis direction (a Y-axis direction), it may be understood that the image sensor S moves in a direction perpendicular to the optical axis (the Z-axis).

In addition, although it is described that the image sensor S is rotated about the optical axis (the Z-axis) for convenience, when the image sensor S is rotated, a rotation axis thereof may not match the optical axis (the Z-axis). For example, the image sensor S may be rotated based on an axis parallel to the direction in which the imaging surface of the image sensor S faces, as a rotation axis.

In addition, the first axis direction (the X-axis direction) and the second axis direction (the Y-axis direction) are examples of two directions perpendicular to the optical axis (the Z-axis) and intersecting each other, and in the present specification, the first axis direction (an X-axis direction) and the second axis direction (the Y-axis direction) may be understood as two directions perpendicular to the optical axis (the Z-axis) and intersecting each other.

Figure 3:
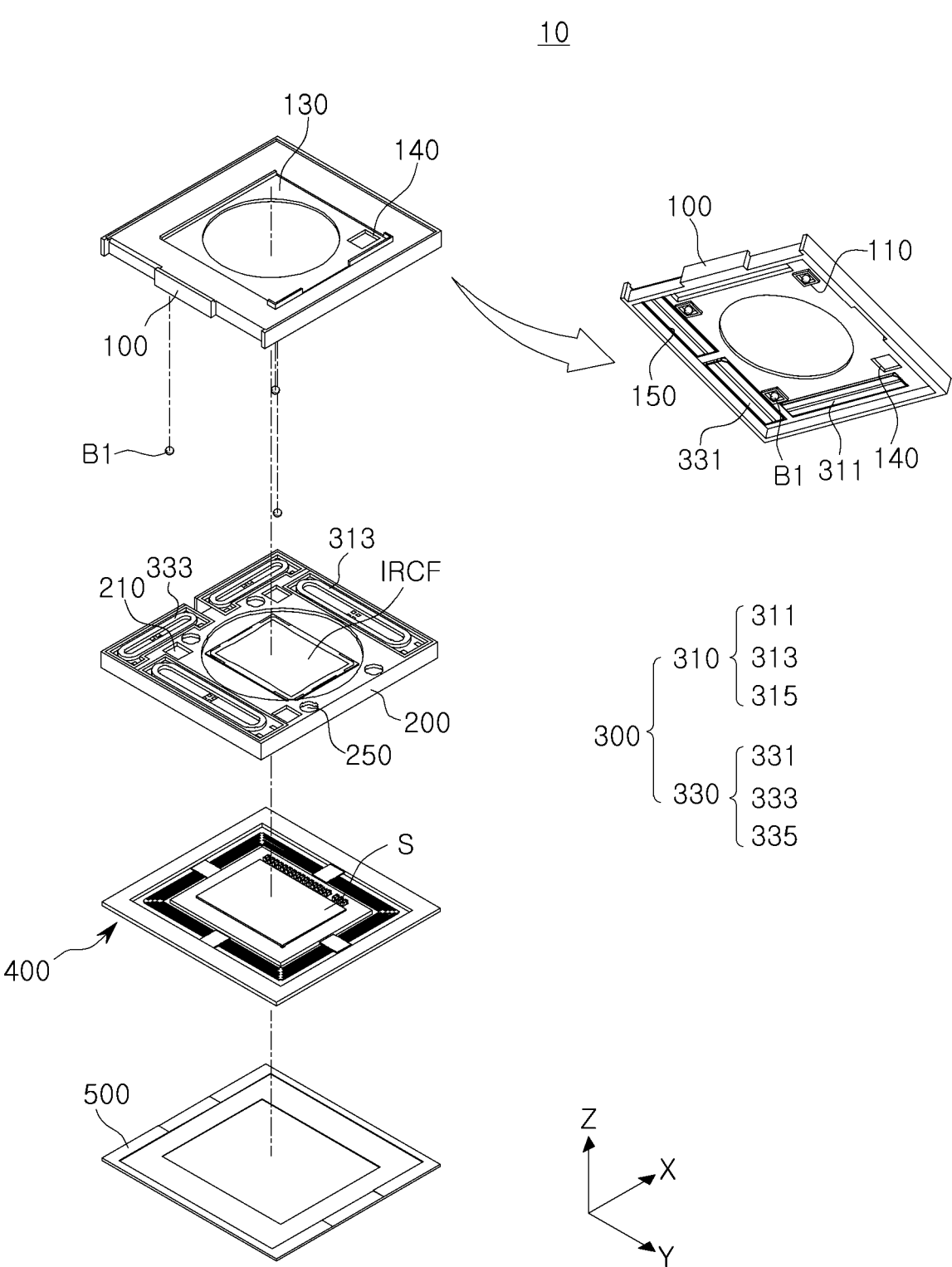
FIG. 3 is an exploded perspective view of a first actuator according to an example embodiment in the present disclosure.
Figure 4:
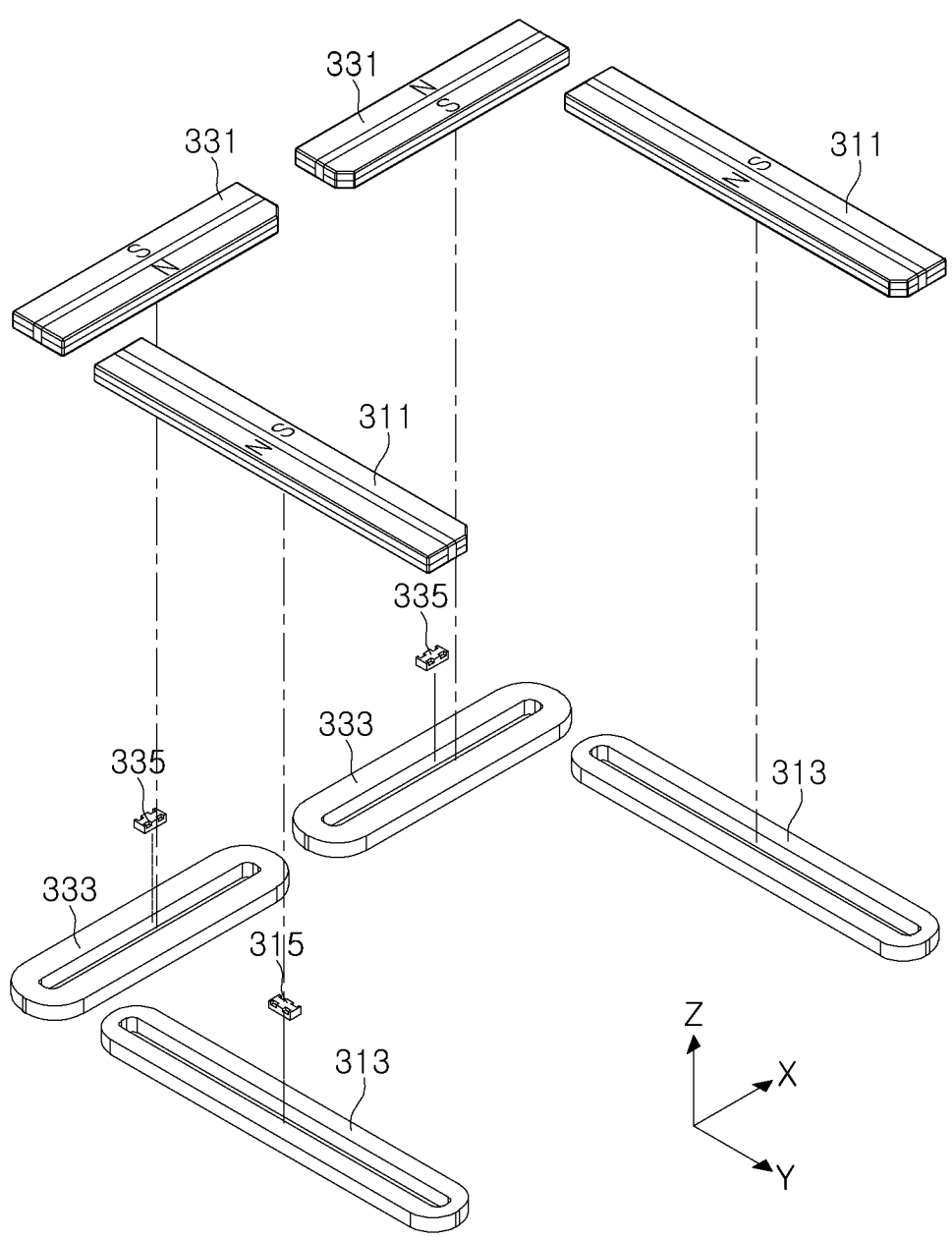
FIG. 4 is an exploded perspective view of a first driving unit of a first actuator according to an example embodiment in the present disclosure.

FIG. 3 is an exploded perspective view of the first actuator according to an example embodiment in the present disclosure, and FIG. 4 is an exploded perspective view of a first driving unit of the first actuator according to an example embodiment in the present disclosure.

Figure 5:
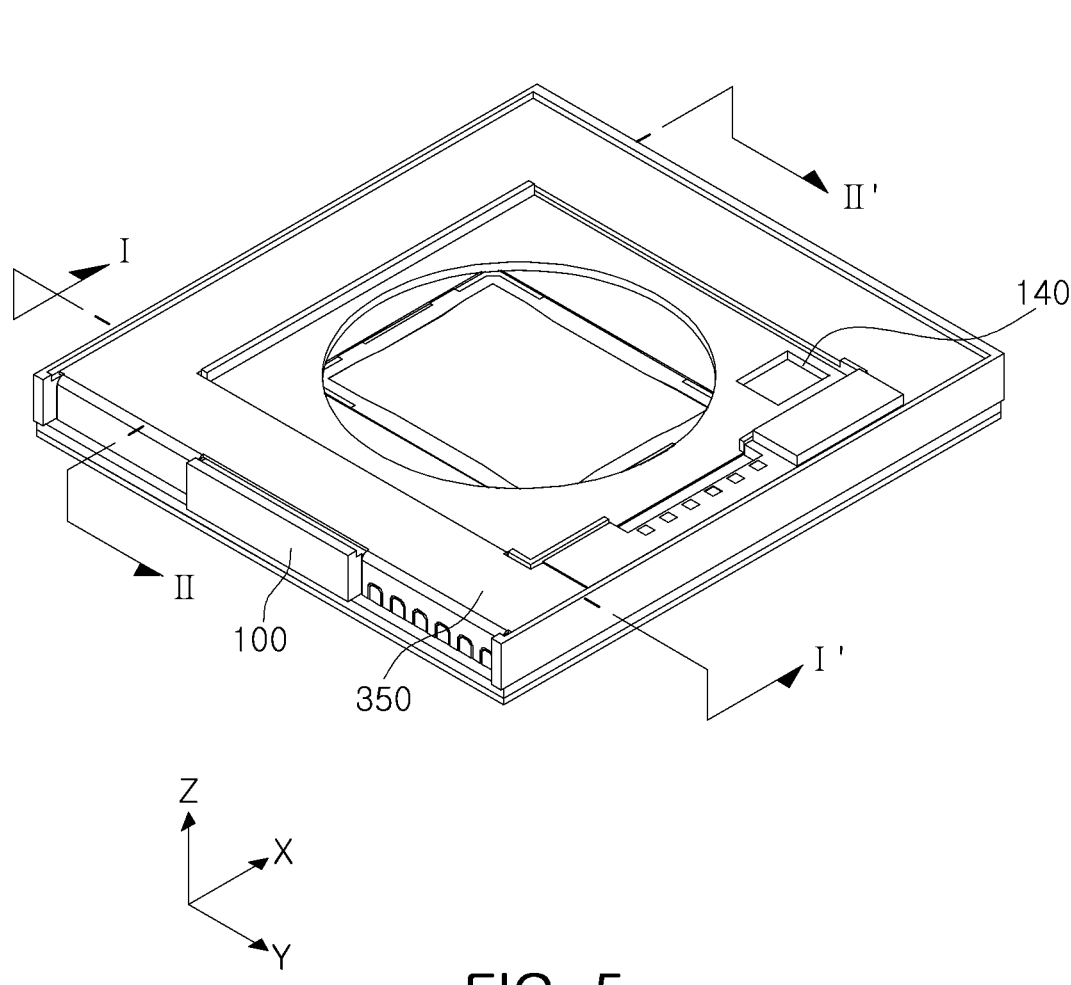
FIG. 5 is a perspective view of a first actuator according to an example embodiment in the present disclosure.
Figure 6A:
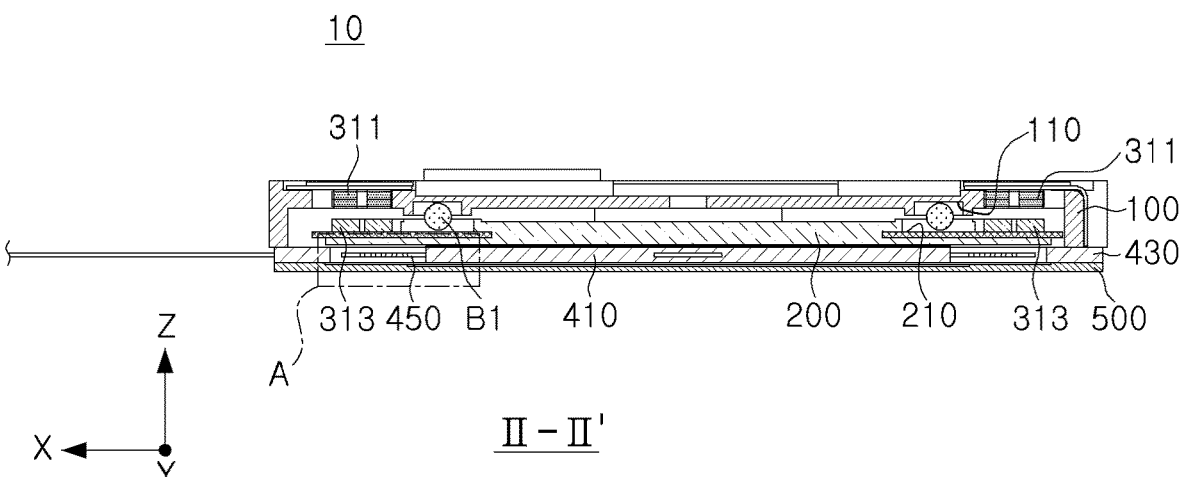
FIG. 6A is a cross-sectional view taken along line II-II' of FIG. 5.
Figure 6B:
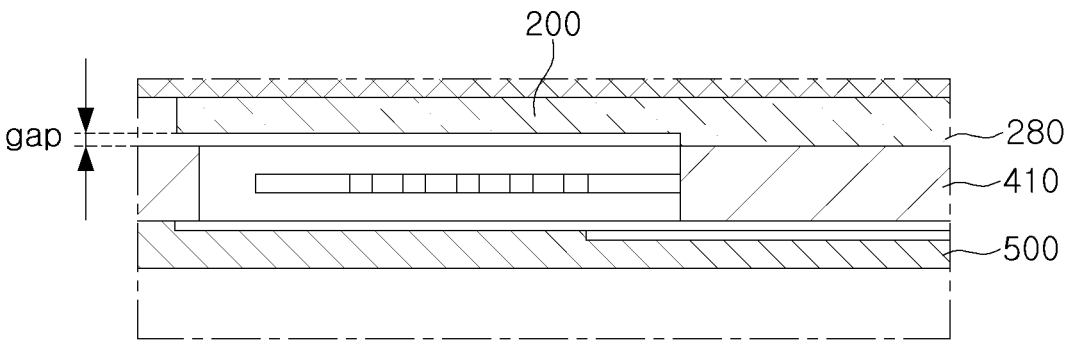
FIG. 6B is an enlarged view of portion A of FIG. 6A.

Also, FIG. 5 is a perspective view of the first actuator according to an example embodiment in the present disclosure, FIG. 6A is a cross-sectional view taken along line II-II' of FIG. 5, and FIG. 6B is an enlarged view of portion A of FIG. 6A.

Figure 7A:
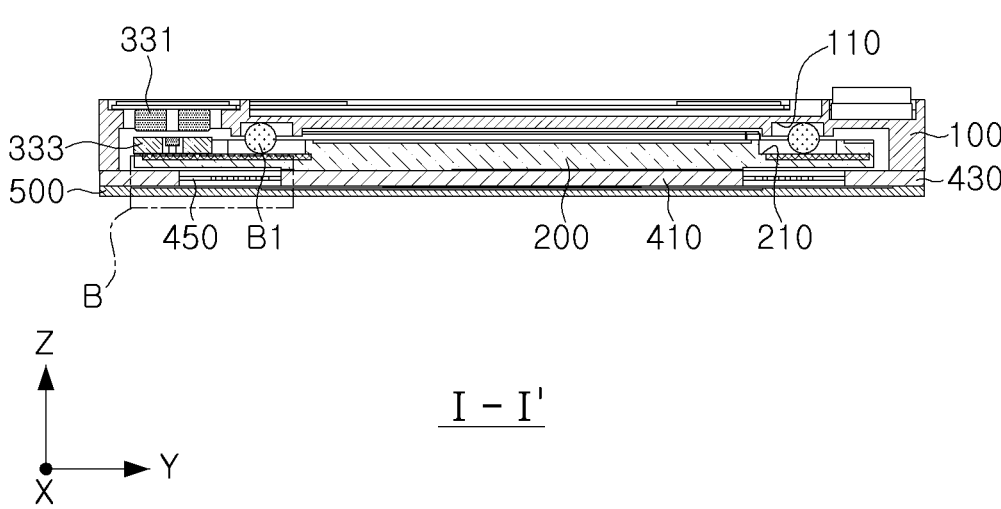
FIG. 7A is a cross-sectional view taken along line I-I' of FIG. 5.
Figure 7B:
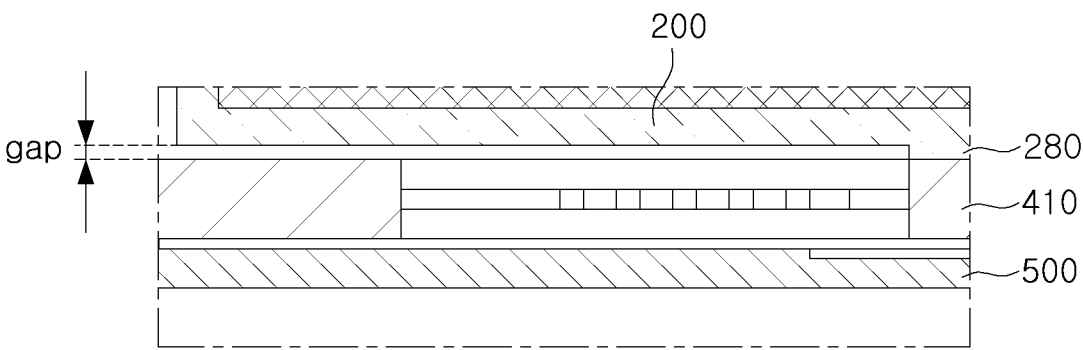
FIG. 7B is an enlarged view of portion B of FIG. 7A.

Also, FIG. 7A is a cross-sectional view taken along line I-I' of FIG. 5, and FIG. 7B is an enlarged view of portion B of FIG. 7A.

Figure 8:
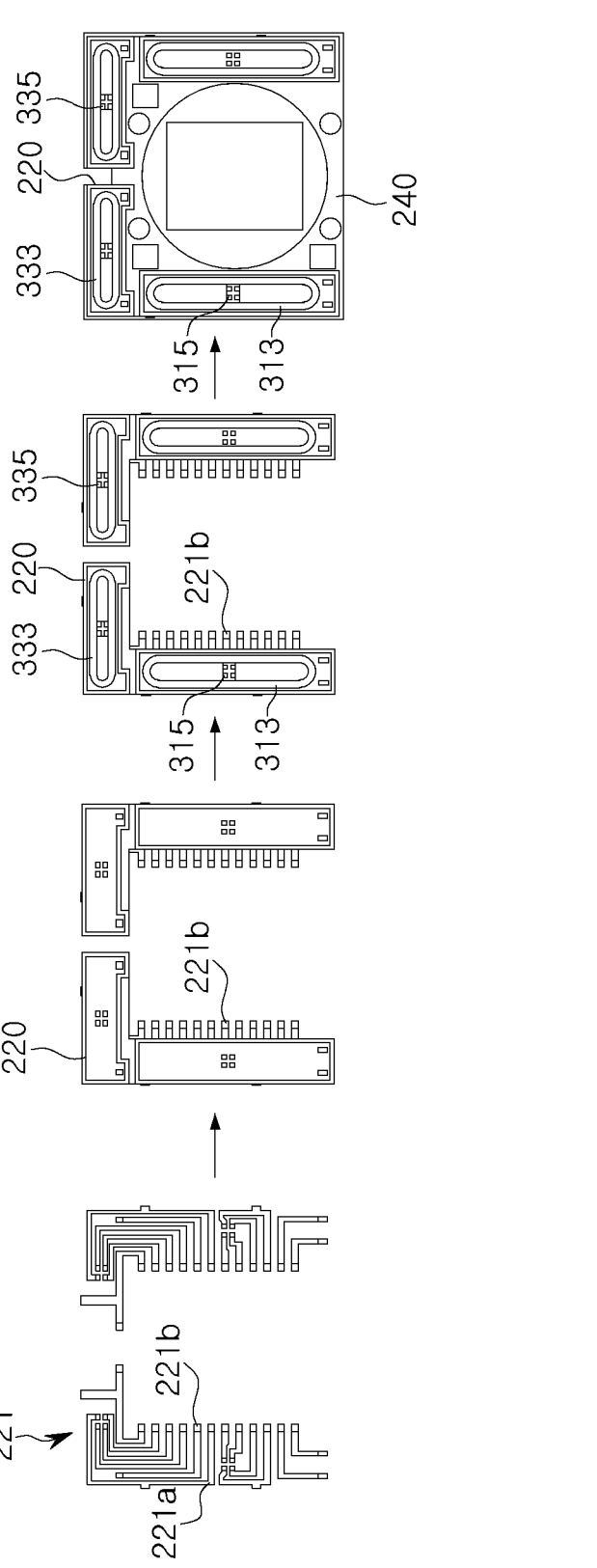
FIG. 8 is a view illustrating a manufacturing process of a moving frame according to an example embodiment in the present disclosure.
Figure 9:
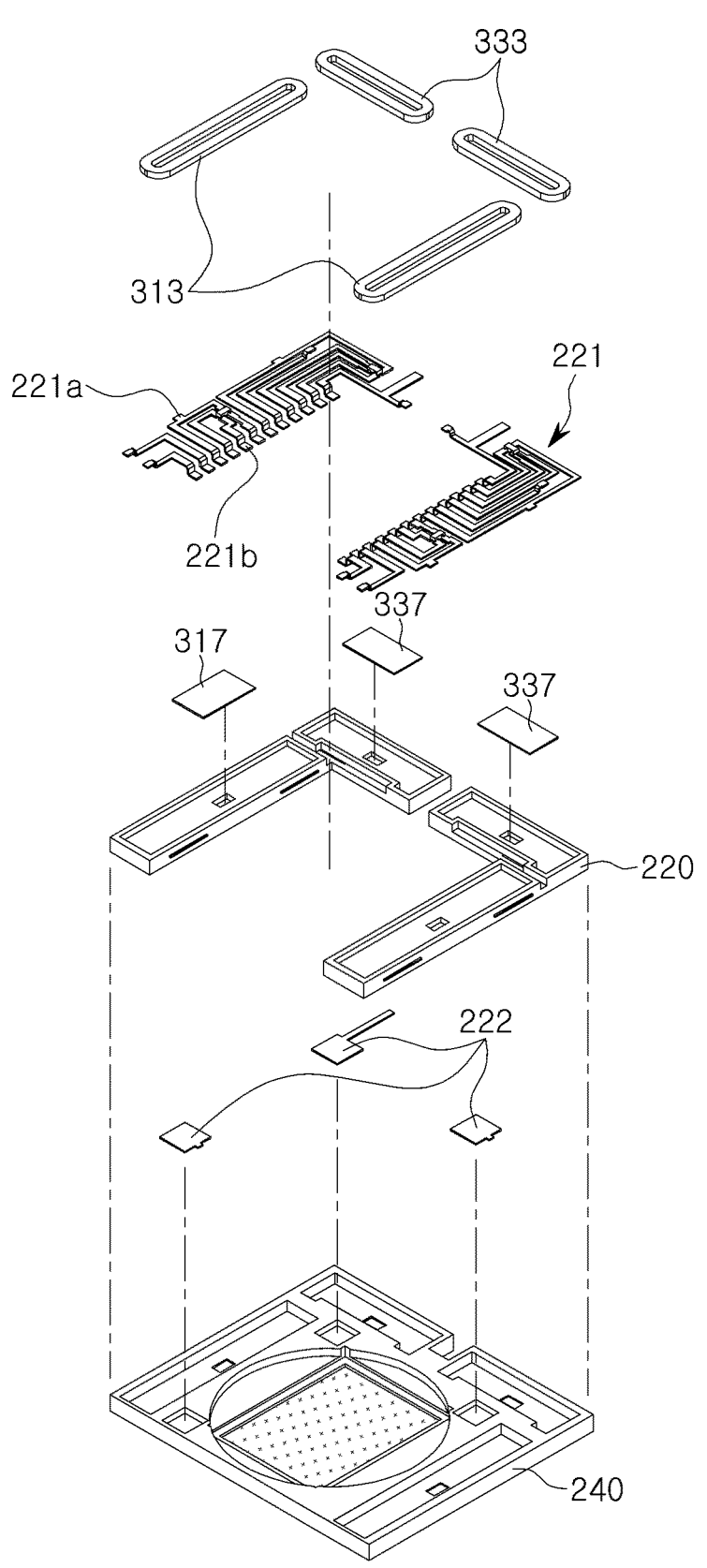
FIG. 9 is an exploded perspective view of a moving frame according to an example embodiment in the present disclosure.
Figure 10:
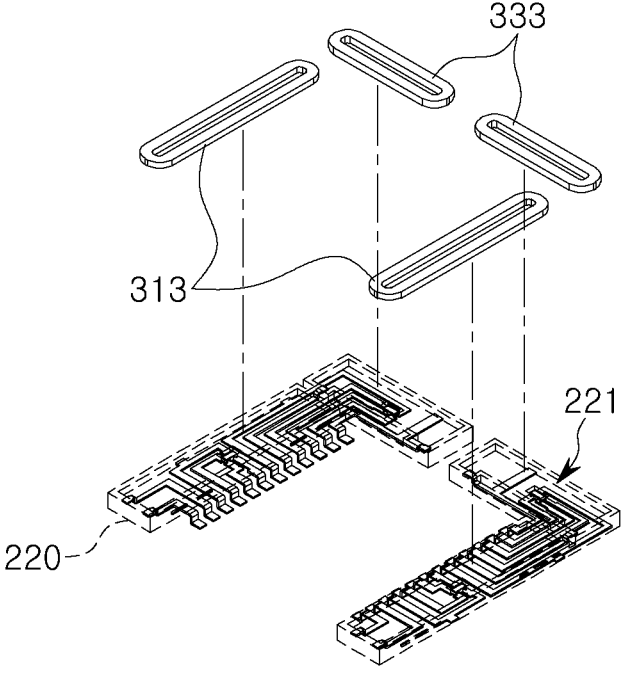
FIGS. 10 and 11 are partially exploded perspective views of a moving frame according to an example embodiment in the present disclosure.
Figure 11:
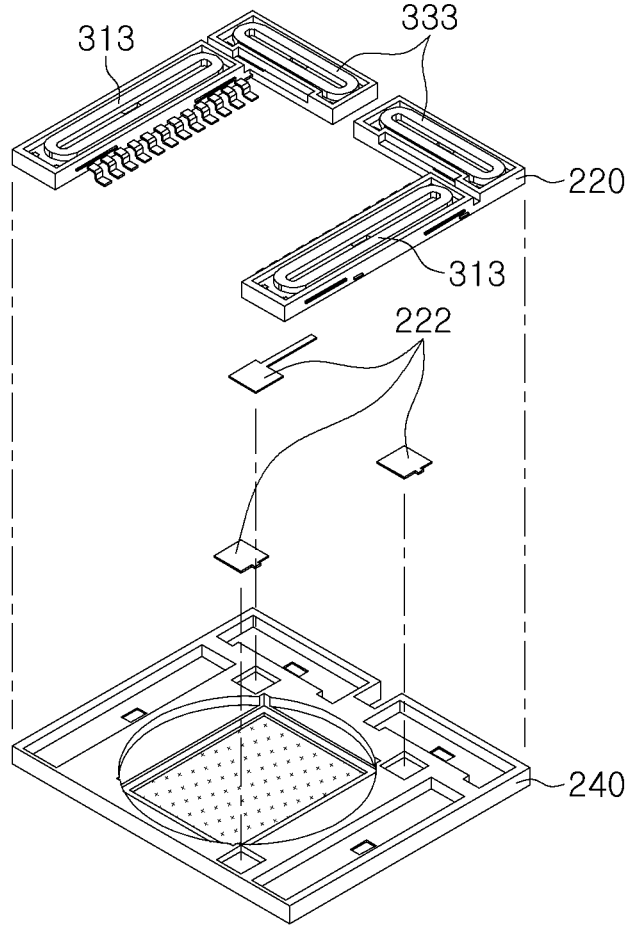
Figure 12:
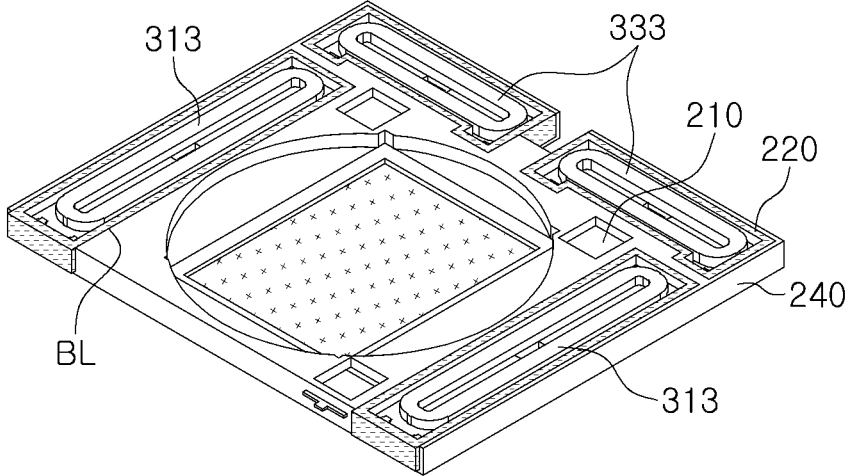
FIG. 12 is a perspective view of a moving frame according to an example embodiment in the present disclosure.
Figure 13:
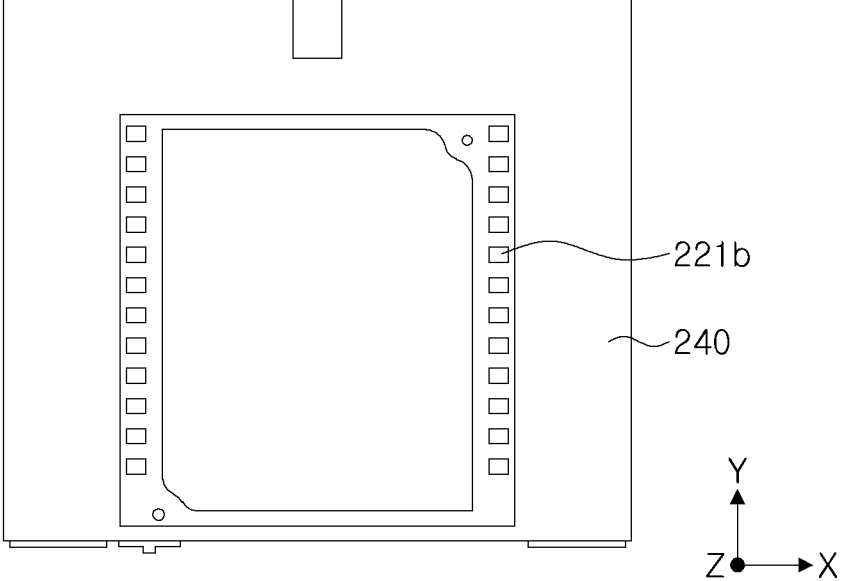
FIG. 13 is a bottom view of a moving frame according to an example embodiment in the present disclosure.

Also, FIG. 8 is a view illustrating a manufacturing process of a moving frame according to an example embodiment in the present disclosure, FIG. 9 is an exploded perspective view of a moving frame according to an example embodiment in the present disclosure, FIGS. 10 and 11 are partially exploded perspective views of a moving frame according to an example embodiment in the present disclosure, FIG. 12 is a perspective view of a moving frame according to an example embodiment in the present disclosure, and FIG. 13 is a bottom view of a moving frame according to an example embodiment in the present disclosure.

Figure 14:
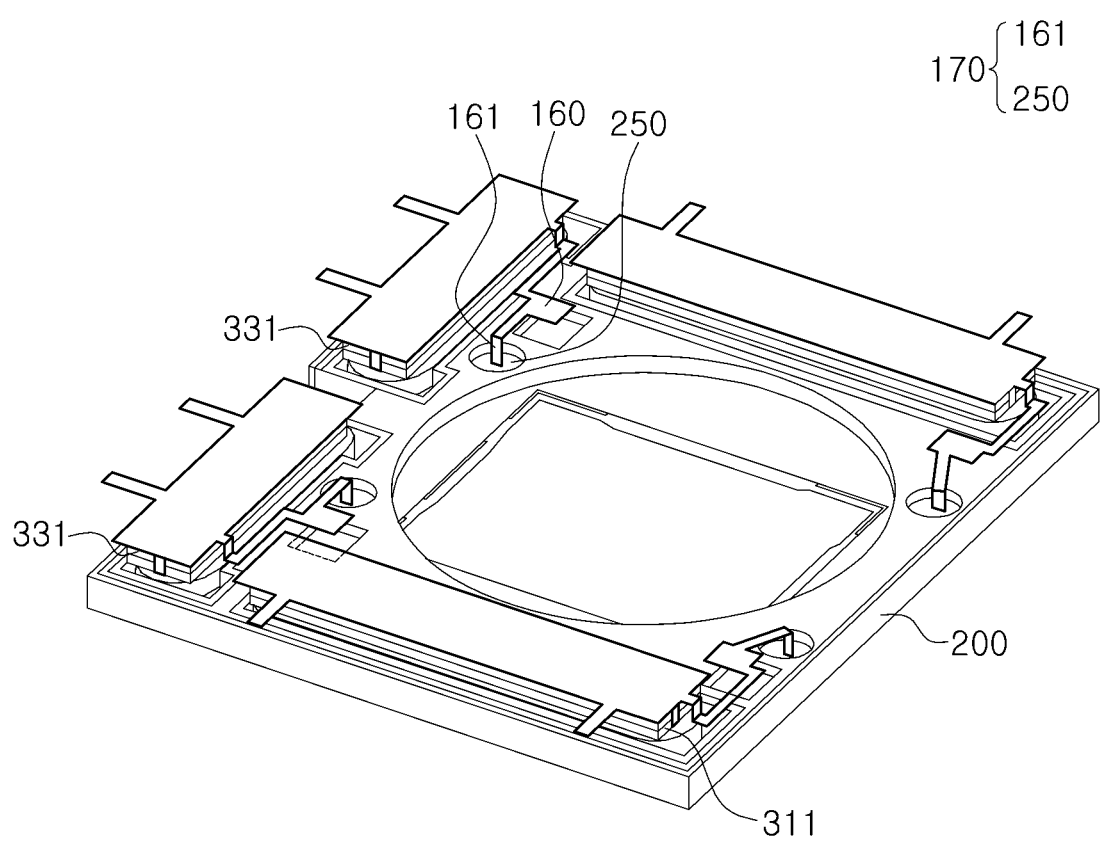
FIGS. 14 and 15 are views illustrating a damping unit of a first actuator according to an example embodiment in the present disclosure.
Figure 15:
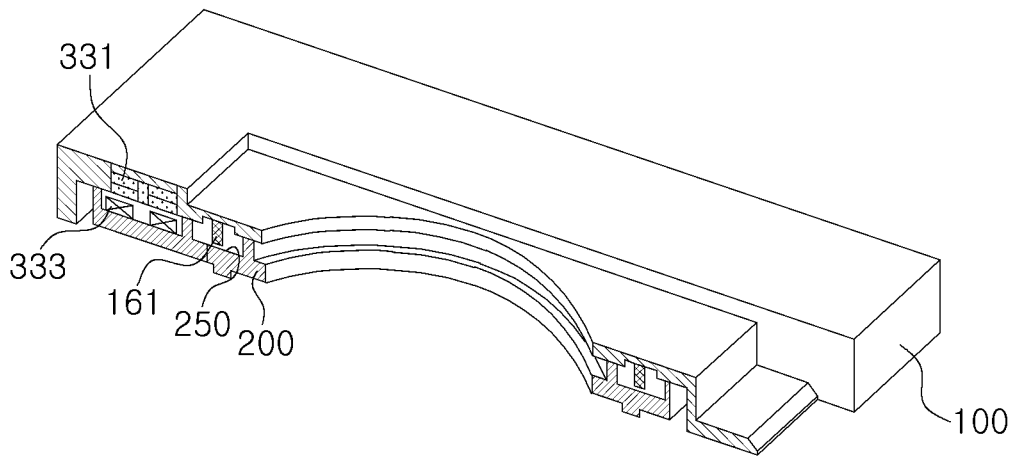
Figure 16:
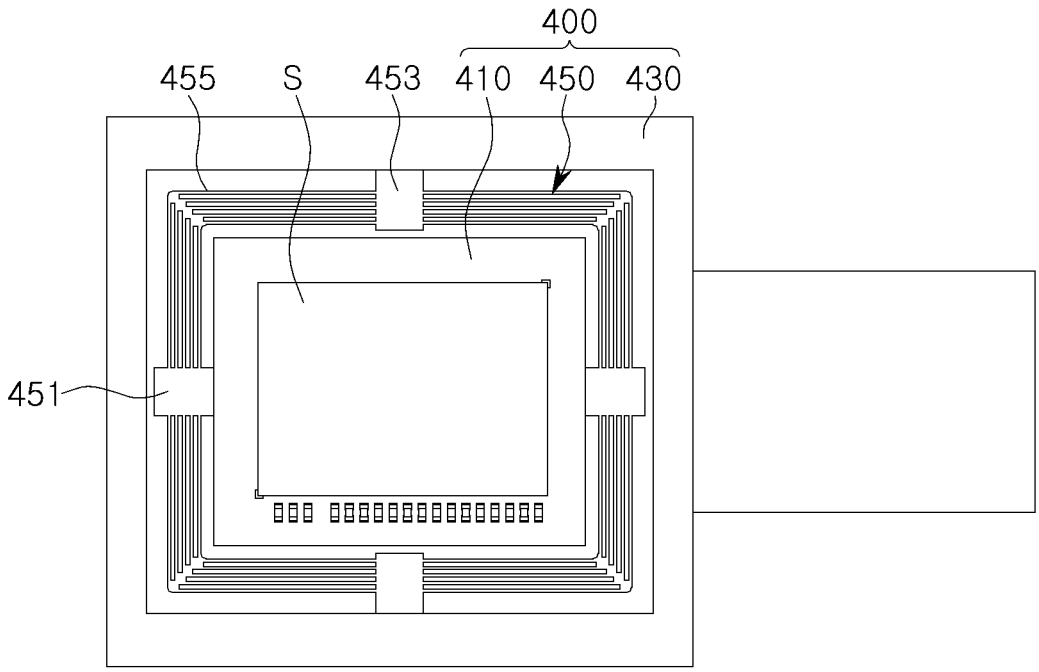
FIG. 16 is a plan view of a sensor substrate according to an example embodiment in the present disclosure.
Figure 16:
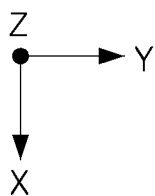

Also, FIGS. 14 and 15 are views illustrating a damping unit of a first actuator according to an example embodiment in the present disclosure, and FIG. 16 is a plan view of a sensor substrate according to an example embodiment in the present disclosure.

A configuration of the first actuator 10 will be described with reference to FIGS. 3 to 16.

First, referring to FIG. 3, the first actuator 10 may include a fixed frame 100, a moving frame 200, a first driving unit 300, and a sensor substrate 400, and may further include a base 500.

The fixed frame 100 is coupled to the second actuator 20 to be described later. For example, the fixed frame 100 may be coupled to a housing 600 of the second actuator 20. A seating recess 130 in which the housing 600 of the second actuator 20 is seated may be provided on an upper surface of the fixed frame 100.

The fixed frame 100 is a fixed member that does not move during focus adjustment and OIS.

The fixed frame 100 may have a shape of a square box with open top and bottom.

The moving frame 200 is accommodated in the fixed frame 100. The fixed frame 100 has a sidewall extending downwardly in the optical axis (Z-axis) direction, and accordingly, the fixed frame 100 may have an accommodation space for accommodating the moving frame 200.

The moving frame 200 may be relatively moved in a direction perpendicular to the optical axis (the Z-axis) with respect to the fixed frame 100 or may be rotated using the optical axis (the Z-axis) as a rotation axis. That is, the moving frame 200 is a moving member moved during OIS.

For example, the moving frame 200 may be configured to be movable in the first axis (X-axis) direction and the second axis (Y-axis) direction, and may be rotated using an optical axis (the Z-axis) as a rotation axis.

The first axis (X-axis) direction may refer to a direction perpendicular to the optical axis (the Z-axis), and the second axis (Y-axis) direction may refer to a direction perpendicular to both the optical axis (Z-axis) direction and the first axis (X-axis) direction.

The moving frame 200 may have a square plate shape with a center penetrated in the optical axis (Z-axis) direction.

An infrared cut filter (IRCF) may be mounted on an upper surface of the moving frame 200. A lower surface of the moving frame 200 may be coupled to a portion of the sensor substrate 400.

A first ball member B1 is disposed between the fixed frame 100 and the moving frame 200.

The first ball member B1 is disposed to contact each of the fixed frame 100 and the moving frame 200.

When the moving frame 200 is moved or rotated relative to the fixed frame 100, the first ball member B1 performs a rolling motion between the fixed frame 100 and the moving frame 200 to support movement of the moving frame 200.

An image sensor S is mounted on the sensor substrate 400. A portion of the sensor substrate 400 is coupled to the moving frame 200. In addition, another portion of the sensor substrate 400 may be coupled to the fixed frame 100. As another example, the other portion of the sensor substrate 400 may also be coupled to the base 500.

The image sensor S is mounted on a portion of the sensor substrate 400 coupled to the moving frame 200.

Since a portion of the sensor substrate 400 is coupled to the moving frame 200, as the moving frame 200 is moved or rotated, a portion of the sensor substrate 400 may also be moved or rotated together with the moving frame 200.

Accordingly, the image sensor S may be moved or rotated in a plane perpendicular to the optical axis (the Z-axis) to perform OIS during image capturing.

The first driving unit 300 may generate driving force in a direction perpendicular to the optical axis (the Z-axis) to move the moving frame 200 in a direction perpendicular to the optical axis (the Z-axis) or rotate the moving frame 200 based on the optical axis (the Z-axis) as a rotation axis.

The first driving unit 300 includes a first sub-driving unit 310 and a second sub-driving unit 330. The first sub-driving unit 310 may generate driving force in the first axis (X-axis) direction, and the second sub-driving unit 330 may generate driving force in the second axis (Y-axis) direction.

The first sub-driving unit 310 includes a first magnet 311 and a first coil 313. The first magnet 311 and the first coil 313 may be disposed to face each other in the optical axis (Z-axis) direction.

The first magnet 311 is disposed on the fixed frame 100. A back yoke may be disposed between the first magnet 311 and the fixed frame 100 (refer to FIG. 14).

The first magnet 311 may include a plurality of magnets. For example, the first magnet 311 may include two magnets, and the two magnets may be symmetrically spaced apart from each other with respect to the optical axis (the Z-axis).

For example, the first magnet 311 may include two magnets spaced apart from each other in a direction (the first axis (X-axis) direction) in which driving force is generated by the first magnet 311.

The fixed frame 100 may include a mounting groove 150 in which the first magnet 311 is disposed. By inserting and disposing the first magnet 311 in the mounting groove 150, it is possible to prevent an increase in the overall height of the first actuator 10 and the camera module 1 due to a thickness of the first magnet 311.

The first magnet 311 may be magnetized so that one surface (e.g., a surface facing the first coil 313) has both an N-pole and an S-pole. For example, on the one surface of the first magnet 311 facing the first coil 313, an N-pole, a neutral region, and an S-pole may be sequentially provided in the first axis (X-axis) direction. The first magnet 311 has a length in the second axis (Y-axis) direction (refer to FIG. 4).

The other surface (e.g., the opposite surface of the one surface) of the first magnet 311 may be magnetized to have both an S-pole and an N-pole. For example, on the other surface of the first magnet 311, an S-pole, a neutral region, and an N-pole may be sequentially provided in the first axis (X-axis) direction.

The first coil 313 is disposed to face the first magnet 311. For example, the first coil 313 may be disposed to face the first magnet 311 in the optical axis (Z-axis) direction.

The first coil 313 has a hollow donut shape and has a length in the second axis (Y-axis) direction. The number of first coils 313 corresponds to the number of first magnets 311.

The first coil 313 is disposed on the moving frame 200.

During OIS, the first magnet 311 is a fixed member fixed to the fixed frame 100, and the first coil 313 is a moving member mounted on the moving frame 200 and moving together with the moving frame 200.

When power is applied to the first coil 313, the moving frame 200 may be moved in the first axis (X-axis) direction by electromagnetic force between the first magnet 311 and the first coil 313.

The first magnet 311 and the first coil 313 may generate driving force in a direction (e.g., the first axis (X-axis) direction) perpendicular to a direction (the optical axis direction) in which they face each other.

The second sub-driving unit 330 includes a second magnet 331 and a second coil 333. The second magnet 331 and the second coil 333 may be disposed to face each other in the optical axis (Z-axis) direction.

The second magnet 331 is disposed on the fixed frame 100. A back yoke may be disposed between the second magnet 331 and the fixed frame 100 (refer to FIG. 14).

The second magnet 331 may include a plurality of magnets. For example, the second magnet 331 may include two magnets, and the two magnets may be spaced apart from each other in the first axis (X-axis) direction. For example, the second magnet 331 may include two magnets spaced apart from each other in a direction perpendicular to a direction (the second axis (Y-axis) direction) in which driving force is generated by the second magnet 331.

The fixed frame 100 may include a mounting groove 150 in which the second magnet 331 is disposed. By inserting and disposing the second magnet 331 into the mounting groove 150, it is possible to prevent an increase in the overall height of the first actuator 10 and the camera module 1 due to a thickness of the second magnet 331.

The second magnet 331 may be magnetized so that one surface (e.g., a surface facing the second coil 333) has both an S-pole and an N-pole. For example, an S-pole, a neutral region, and an N-pole may be sequentially provided on the one surface of the second magnet 331 facing the second coil 333 in the second axis (Y-axis) direction (refer to FIG. 4). The second magnet 331 has a shape having a length in the first axis (X-axis) direction.

The other surface (e.g., the opposite surface of the one surface) of the second magnet 331 may be magnetized to have both an N-pole and an S-pole. For example, on the other surface of the second magnet 331, an N-pole, a neutral region, and an S-pole may be sequentially provided in the second axis (Y-axis) direction.

Magnetization directions of the two magnets of the second magnet 331 may be opposite to each other.

The second coil 333 is disposed to face the second magnet 331. For example, the second coil 333 may be disposed to face the second magnet 331 in the optical axis (Z-axis) direction.

The second coil 333 has a hollow donut shape, and has a length in the first axis (X-axis) direction. The number of second coils 333 corresponding to the number of second magnets 331.

The second coil 333 is disposed on the moving frame 200.

During OIS, the second magnet 331 is a fixed member fixed to the fixed frame 100, and the second coil 333 is a moving member mounted on the moving frame 200 and moving together with the moving frame 200.

When power is applied to the second coil 333, the moving frame 200 may be moved in the second axis (Y-axis) direction by electromagnetic force between the second magnet 331 and the second coil 333.

The second magnet 331 and the second coil 333 may generate driving force in a direction (e.g., the second axis (Y-axis) direction) perpendicular to a direction (the optical axis direction) in which they face each other.

Meanwhile, the moving frame 200 may be rotated based on the optical axis (the Z-axis) by the first sub-driving unit 310 and the second sub-driving unit 330.

The first magnet 311 and the second magnet 331 are disposed to be perpendicular to each other in a plane perpendicular to the optical axis (the Z-axis), and the first coil 313 and the second coil 333 are also disposed to be perpendicular to each other in a plane perpendicular to the optical axis (the Z-axis).

The first ball member B1 is disposed between the fixed frame 100 and the moving frame 200.

The first ball member B1 is disposed to contact each of the fixed frame 100 and the moving frame 200.

The first ball member B1 functions to guide movement of the moving frame 200 during an OIS process. In addition, the first ball member B1 also functions to maintain an interval between the fixed frame 100 and the moving frame 200.

The first ball member B1 performs a rolling motion in the first axis (X-axis) direction when driving force in the first axis (X-axis) direction is generated. Accordingly, the first ball member B1 guides movement of the moving frame 200 in the first axis (X-axis) direction.

In addition, when the driving force in the second axis (Y-axis) direction is generated, the first ball member B1 rolls in the second axis (Y-axis) direction. Accordingly, the first ball member B1 guides the movement of the moving frame 200 in the second axis (Y-axis) direction.

The first ball member B1 includes a plurality of balls disposed between the fixed frame 100 and the moving frame 200.

Referring to FIG. 3, at least one of the surfaces of the fixed frame 100 and the moving frame 200 facing each other in the optical axis (Z-axis) direction includes a guide recess in which the first ball member B1 is disposed. A plurality of guide recesses are provided to correspond to the plurality of balls of the first ball member B1.

For example, a first guide recess 110 may be provided on a lower surface of the fixed frame 100, and a second guide recess 210 may be provided on an upper surface of the moving frame 200.

The first ball member B1 is disposed in the first guide recess 110 and the second guide recess 210 to be fitted between the fixed frame 100 and the moving frame 200.

The first guide recess 110 and the second guide recess 210 may each have a polygonal or circular planar shape. The sizes of the first guide recess 110 and the second guide recess 210 are larger than a diameter of the first ball member B1. For example, cross-sections of the first guide recess 110 and the second guide recess 210 on a plane perpendicular to the optical axis (the Z-axis) may have a size greater than the diameter of the first ball member B1.

A specific shape of the first guide recess 110 and the second guide recess 210 is not limited as long as the size is larger than the diameter of the first ball member B1.

Accordingly, the first ball member B1 may perform a rolling motion in a direction perpendicular to the optical axis (the Z-axis) in the state accommodated in the first guide recess 110 and the second guide recess 210.

Meanwhile, the fixed frame 100 and the moving frame 200 may include support pads 160 and 222, respectively, and at least a portion of the support pads 160 and 222 may form a bottom surface of the first guide recess 110 and the second guide recess 210 (refer to FIGS. 9 and 14). Accordingly, the first ball member B1 may roll in contact with the support pads 160 and 222.

The support pads 160 and 222 may be integrally coupled to the fixed frame 100 and the moving frame 200 by insert injection. In this case, by injecting a resin material into a mold in a state in which the support pads 160 and 222 are fixed in the mold, the support pads 160 and 222 may be manufactured to be integrated with the fixed frame 100 and the moving frame 200.

The support pads 160 and 222 may be formed of a non-magnetic metal (e.g., stainless steel).

As illustrated in FIG. 6A, when driving force is generated in the first axis (X-axis) direction, the moving frame 200 is moved in the first axis (X-axis) direction.

In addition, as illustrated in FIG. 7A, when driving force is generated in the second axis (Y-axis) direction, the moving frame 200 is moved in the second axis (Y-axis) direction.

In addition, the moving frame 200 may be rotated by generating a deviation in at least one of a magnitude of the driving force in the first axis (X-axis) direction and a magnitude of the driving force in the second axis (Y-axis) direction.

A portion of the sensor substrate 400 is coupled to the moving frame 200 and the image sensor S is disposed on the sensor substrate 400. As a result, as the moving frame 200 is moved, the image sensor S may also be moved or rotated.

Meanwhile, referring to FIGS. 6B and 7B, a protrusion 280 protruding toward the sensor substrate 400 may be disposed on the moving frame 200. For example, the protrusion 280 may be disposed on a lower surface of the moving frame 200, and the protrusion 280 may be coupled to the moving portion 410 of the sensor substrate 400. Accordingly, a gap is formed between the body of the moving frame 200 and the sensor substrate 400 in the optical axis (Z-axis) direction, and accordingly, when the moving frame 200 is moved on an X-Y plane, the moving frame 200 may be prevented from being interfered with the sensor substrate 400.

In FIGS. 6B and 7B, the protrusion 280 is disposed on a lower surface of the moving frame 200, but this is only an example, and the protrusion 280 may be disposed on an upper surface of the sensor substrate 400.

The first actuator 10 may detect a position in a direction perpendicular to the optical axis (the Z-axis) of the moving frame 200.

To this end, a first position sensor 315 and a second position sensor 335 are provided (refer to FIG. 4). The first position sensor 315 is disposed on the moving frame 200 to face the first magnet 311, and the second position sensor 335 is disposed on the moving frame 200 to face the second magnet 331. The first position sensor 315 and the second position sensor 335 may be Hall sensors.

Here, referring to the example embodiment illustrated in FIG. 4, the second position sensor 335 may include two Hall sensors. For example, the second magnet 331 includes two magnets spaced apart from each other in a direction (the first axis (X-axis) direction) perpendicular to a direction (the second axis (Y-axis) direction) in which driving force is generated by the second magnet 331, and the second position sensor 335 includes two Hall sensors facing the two magnets.

Whether the moving frame 200 is rotated may be detected through two Hall sensors facing the second magnet 331.

Meanwhile, rotational force may be generated on purpose by generating a deviation between the driving force of the first sub-driving unit 310 and the driving force of the second sub-driving unit 330, by using the resultant force of the first sub-driving unit 310 and the second sub-driving unit 330, or by using two magnets included in the second sub-driving unit 330.

Since the first guide recess 110 and the second guide recess 210 have a polygonal or circular planar shape larger than the diameter of the first ball member B1, the first ball member B1 disposed between the first guide recess 110 and the second guide recess 210 may perform a rolling motion in the direction perpendicular to the optical axis (the Z-axis) without limitation.

Accordingly, the moving frame 200 may be rotated based on the optical axis (the Z-axis) in a state supported by the first ball member B1.

In addition, when rotation is not required and linear movement is required, rotational force that is unintentionally generated may be offset by controlling the driving force of the first sub-driving unit 310 and/or the driving force of the second sub-driving unit 330.

Referring to FIGS. 8 to 13, the first coil 313 and the second coil 333 are disposed on the moving frame 200, and a wiring pattern 221 is disposed inside of the moving frame 200. The wiring pattern 221 may be connected to the first coil 313 and the second coil 333. Also, the wiring pattern 221 of the moving frame 200 may be connected to the sensor substrate 400. Accordingly, the first coil 313 and the second coil 333 may receive power through the wiring pattern 221 disposed on the moving frame 200.

That is, the camera module 1 according to an example embodiment in the present disclosure does not have a separate printed circuit board (PCB) for supplying power to the first driving unit 300, and the moving frame 200 itself has the wiring pattern 221 to supply power to the first driving unit 300.

The wiring pattern 221 may be integrally coupled to the moving frame 200 by insert injection. For example, by injecting a resin material into the mold while the wiring pattern 221 is disposed in the mold, the wiring pattern 221 may be manufactured to be integrated with the moving frame 200.

The camera module 1 according to an example embodiment in the present disclosure may undergo injection at least twice in the process of manufacturing the moving frame 200.

If a pattern width of the wiring pattern 221 is minimized to reduce the size, the rigidity of the wiring pattern 221 may not be sufficient, so that it may be difficult to fix a position of the wiring pattern 221 during insert injection.

Therefore, a primary injection molding product (for example, a first frame 220) integrated with the wiring pattern 221 may be manufactured by insert injection, and then the primary injection molding product may be insert-injected to manufacture a secondary injection molding product (for example, a second frame 240), thereby manufacturing the moving frame 200 having the wiring pattern 221 therein.

Since at least two injections are performed, a boundary line BL is formed between the first frame 220 that is the primary injection molding product and the second frame 240 that is the secondary injection molding product.

The first frame 220 and the second frame 240 are each formed of a plastic material. In addition, the plastic material of the first frame 220 and the plastic material of the second frame 240 may be the same or different.

The wiring pattern 221 may be disposed inside of the first frame 220 and inside the second frame 240, and a portion of the wiring pattern 221 may be exposed to the outside of the first frame 220, and another portion of the wiring pattern 221 may be exposed to the outside of the second frame 240. The portion of the wiring pattern 221 exposed to the outside of the first frame 220 may be connected to the first coil 313 and the second coil 333, and other portion of the wiring pattern 221 exposed to the outside of the second frame 240 may be connected to the sensor substrate 400.

The first coil 313, the second coil 333, the first position sensor 315, and the second position sensor 335 are mounted on the first frame 220, which is the primary injection molding product. The first coil 313, the second coil 333, the first position sensor 315, and the second position sensor 335 are connected to the wiring pattern 221 provided in the first frame 220.

The wiring pattern 221 includes a wiring portion 221a and a terminal portion 221b.

A portion of the wiring portion 221a is exposed to an upper surface of the moving frame 200, and the remaining portion of the wiring portion 221a is disposed inside of the moving frame 200. Also, the terminal portion 221b is exposed to a lower surface of the moving frame 200.

For example, a portion of the wiring portion 221a is exposed to an upper surface of the first frame 220, and the remaining portion (where the remaining portion is another portion of the wiring portion 221a except for the portion exposed to an upper surface of the first frame 220) is located inside the first frame 220. In addition, the remaining portion of the wiring portion 221a may extend to the inside of the second frame 240 to be positioned.

The terminal portion 221b is disposed to be exposed to the outside of the first frame 220. Also, the terminal portion 221b is disposed to be exposed to the outside of the second frame 240.

Since the terminal portion 221b of the wiring pattern 221 is connected to the sensor substrate 400, power may be applied to the first coil 313 and the second coil 333 through the wiring pattern 221.

Meanwhile, the second guide recess 210 in which the first ball member B1 is disposed is formed in the second frame 240. Since a material of the first ball member B1 may be ceramic and a material of the second frame 240 is plastic, there is a risk that the second guide recess 210 may be damaged due to a difference in rigidity.

Therefore, in order to prevent damage to the second guide recess 210, a support pad 222 is disposed in the second guide recess 210, and the support pad 222 may be insert-injected during the secondary injection process to be integrated with the second frame 240.

The support pad 222 is disposed inside of the second frame 240, and one surface of the support pad 222 may be exposed to the outside of the second frame 240 to contact the first ball member B1.

The support pad 222 may be formed of a non-magnetic metal (e.g., stainless steel).

The support pad 222 may form a bottom surface of the second guide recess 210. Accordingly, the first ball member B1 may roll in contact with the support pad 222.

A first yoke 317 and a second yoke 337 are disposed inside of the moving frame 200. The first yoke 317 and the second yoke 337 provide attractive force so that the fixed frame 100 and the moving frame 200 may maintain a contact state with the first ball member B1.

The first yoke 317 and the second yoke 337 may be insert-injected in the same manner as the wiring pattern 221 during the primary injection process to be integrated with the first frame 220 (refer to FIG. 9).

The first yoke 317 and the second yoke 337 are disposed to face the first magnet 311 and the second magnet 331 in the optical axis (Z-axis) direction.

The first coil 313 and the wiring pattern 221 may be located between the first magnet 311 and the first yoke 317, and the second coil 333 and the wiring pattern 221 may be located between the second magnet 331 and the second yoke 337.

At least a portion of each of the first yoke 317 and the second yoke 337 may be disposed inside of the first frame 220.

Attractive force acts between the first yoke 317 and the first magnet 311 and between the second yoke 337 and the second magnet 331 in the optical axis (Z-axis) direction.

Accordingly, since the moving frame 200 is pressed in a direction toward the fixed frame 100, the fixed frame 100 and the moving frame 200 may maintain contact with the first ball member B1.

The first yoke 317 and the second yoke 337 are formed of a material capable of respectively generating attractive force between the first magnet 311 and the second magnet 331. For example, the first yoke 317 and the second yoke 337 are provided as magnetic members.

The number of the first yoke 317 and the second yoke 337 is not particularly limited, but the center of action of the attractive force acting between the first magnet 311 and the second magnet 331 and the first yoke 317 and the second yoke 337 should be located in a support region connecting the plurality of balls included in the first ball member B1 to each other.

Meanwhile, the first actuator 10 may include a damping unit 170. The damping unit 170 includes a plurality of damping recesses 250, a plurality of damping pins 161, and a damping gel.

Referring to FIGS. 14 and 15, a plurality of damping recesses 250 may be disposed in the moving frame 200. For example, the plurality of damping recesses 250 may be formed on an upper surface of the moving frame 200. In addition, the plurality of damping recesses 250 may be disposed adjacent to the plurality of second guide recesses 210. The plurality of damping recesses 250 are disposed in the second frame 240 constituting the moving frame 200.

The fixed frame 100 includes the plurality of damping pins 161 extending toward the plurality of damping recesses 250.

At least a portion of the damping pins 161 extending from the fixed frame 100 may be accommodated in each damping recess 250. For example, the plurality of damping pins 161 protruding from the fixed frame 100 to extend in the optical axis (Z-axis) direction may be disposed on the fixed frame 100, and at least a portion of each damping pin 161 may be disposed in each damping recess 250 of the moving frame 200.

In addition, the damping gel may be disposed in the plurality of damping recesses 250. Also, a portion of the damping pin 161 is disposed in the damping gel. For example, at least a portion of each damping pin 161 may be disposed in damping gel.

During OIS, since the moving frame 200 is a moving member and the fixed frame 100 is a fixed member, the damping recess 250 may be moved relative to the damping pin 161. In addition, since the damping pin 161 is contained in the damping gel, resistance may occur due to the damping gel when the damping recess 250 moves. Accordingly, the damping structure may be easily implemented.

Referring to FIG. 16, the sensor substrate 400 includes a moving portion 410, a fixed portion 430, and a connection portion 450. The sensor substrate 400 may be a rigid flexible printed circuit board (RF PCB).

The moving portion 410 is equipped with an image sensor S. The moving portion 410 is coupled to a lower surface of the moving frame 200. For example, the area of the moving portion 410 is larger than the area of the image sensor S, and the moving portion 410 at an outer portion of the image sensor S may be coupled to a lower surface of the moving frame 200.

The moving portion 410 is a moving member that moves together with the moving frame 200 during OIS. The moving portion 410 may be a rigid PCB.

The fixed portion 430 is coupled to a lower surface of the fixed frame 100. The fixed portion 430 is a fixing member that does not move during OIS. The fixed portion 430 may be a rigid PCB.

The connection portion 450 is disposed between the moving portion 410 and the fixed portion 430, and may connect the moving portion 410 and the fixed portion 430. The connection portion 450 may be a flexible PCB. When the moving portion 410 is moved, the connection portion 450 disposed between the moving portion 410 and the fixed portion 430 may be bent.

The connection portion 450 extends along the circumference of the moving portion 410. The connection portion 450 is provided with a plurality of slits penetrating through the connection portion 450 in the optical axis direction. The plurality of slits are disposed at an interval between the moving portion 410 and the fixed portion 430. Accordingly, the connection portion 450 may include a plurality of bridge elements 455 spaced apart by the plurality of slits. The plurality of bridge elements 455 extend along the circumference of the moving portion 410. Each bridging element may have a width smaller than a thickness thereof.

The connection portion 450 includes a first support portion 451 and a second support portion 453. The connection portion 450 is connected to the moving portion 410 through the first support portion 451. In addition, the connection portion 450 is connected to the fixed portion 430 through the second support portion 453.

For example, the first support portion 451 is connected to contact the moving portion 410 and is spaced apart from the fixed portion 430. In addition, the second support portion 453 is connected to contact the fixed portion 430 and is spaced apart from the moving portion 410.

For example, the first support portion 451 may extend in the second axis direction (the Y-axis direction) to connect the plurality of bridges 455 of the connection portion 450 and the moving portion 410. In an example embodiment, the first support portion 451 may include two support portions disposed opposite to each other in the second axis direction (the Y-axis direction).

The second support portion 453 may extend in the first axis direction (the X-axis direction) to connect the plurality of bridges 455 of the connection portion 450 and the fixed portion 430. In an example embodiment, the second support portion 453 may include two support portions disposed opposite to each other in the first axis direction (the X-axis direction).

Accordingly, the moving portion 410 may be moved in a direction perpendicular to the optical axis (the Z-axis) or rotated based on the optical axis (the Z-axis) while being supported by the connection portion 450.

In an example embodiment, when the image sensor S is moved in the first axis direction (the X-axis direction), the plurality of bridges 455 connected to the second support portion 453 may be bent. Also, when the image sensor S is moved in the second axis direction (the Y-axis direction), the plurality of bridges 455 connected to the first support portion 451 may be bent. Also, when the image sensor S is rotated based on the optical axis (the Z-axis), the plurality of bridges 455 connected to the first support portion 451 and the plurality of bridges 455 connected to the second support portion 453 may be bent together.

Meanwhile, the base 500 may be coupled to a lower portion of the sensor substrate 400.

The base 500 may be coupled to the sensor substrate 400 to cover a lower portion of the sensor substrate 400. The base 500 may serve to prevent an external foreign material from being introduced through a gap between the moving portion 410 and the fixed portion 430 of the sensor substrate 400.

Figure 17:
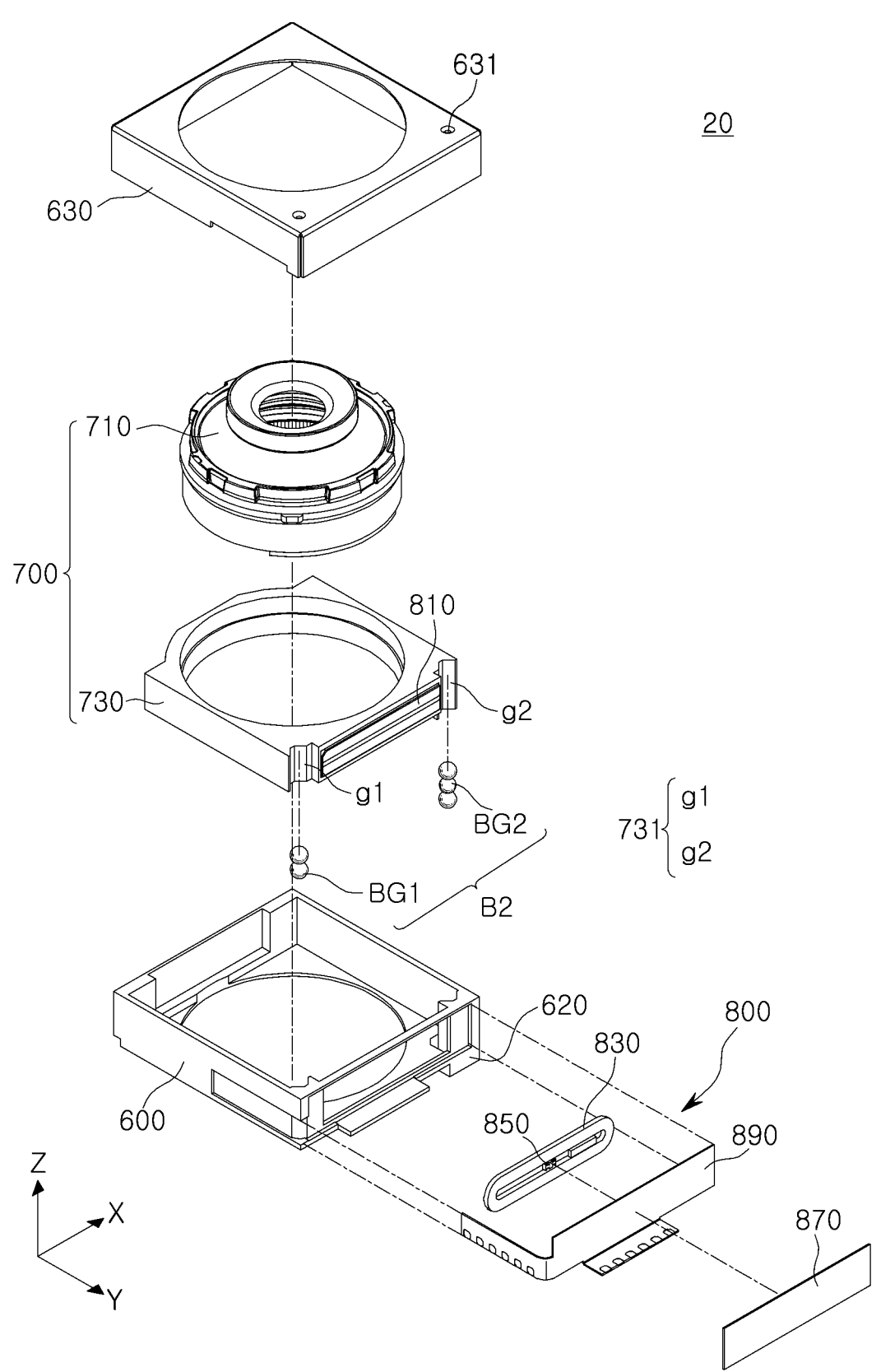
FIG. 17 is an exploded perspective view of a second actuator according to an example embodiment in the present disclosure.
Figure 18:
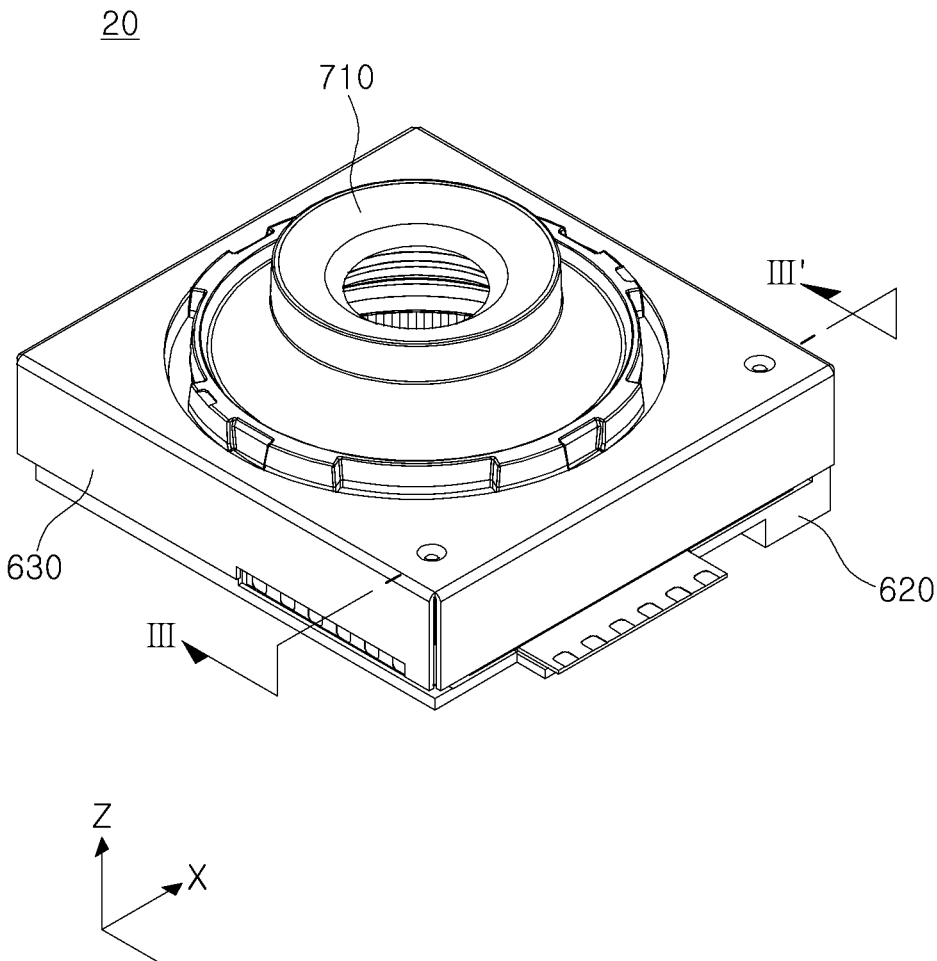
FIG. 18 is a perspective view of a second actuator according to an example embodiment in the present disclosure.

FIG. 17 is an exploded perspective view of a second actuator according to an example embodiment in the present disclosure, and FIG. 18 is a perspective view of a second actuator according to an example embodiment in the present disclosure.

Figure 19:
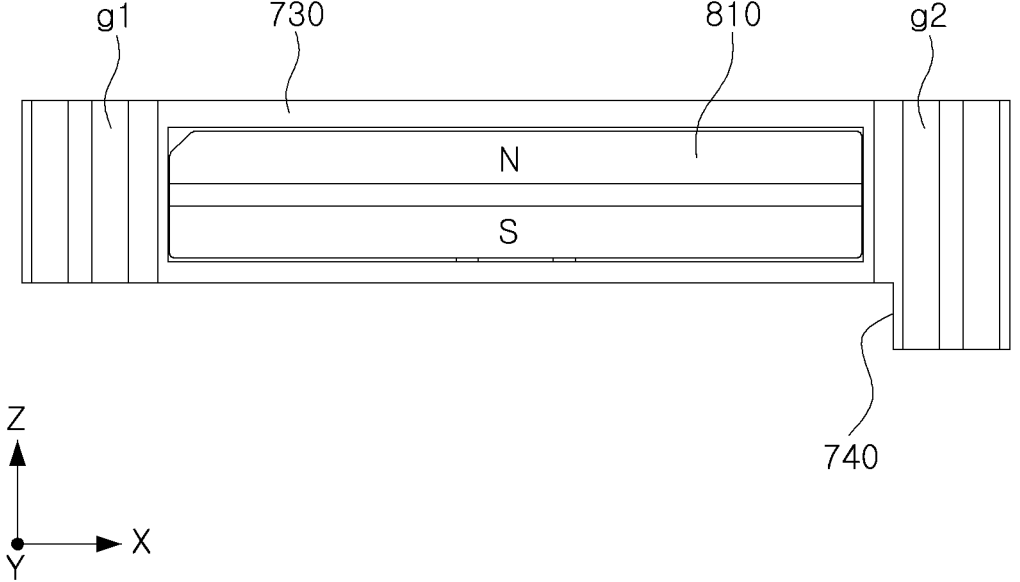
FIG. 19 is a side view of a carrier of a second actuator according to an example embodiment in the present disclosure.
Figure 20:
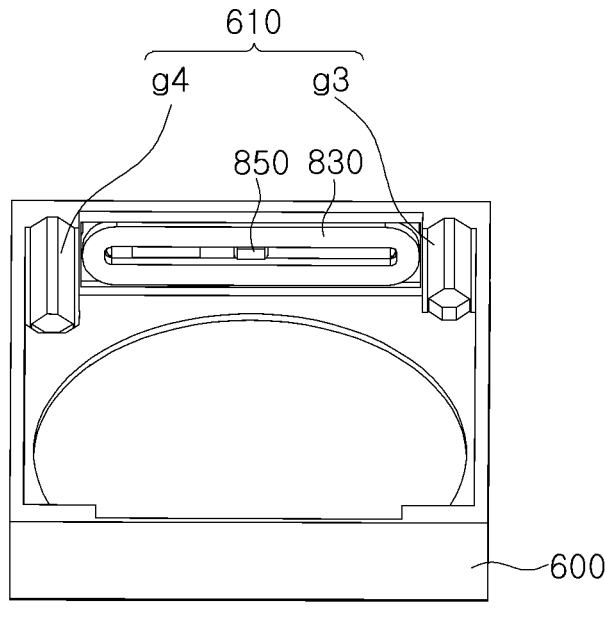
FIG. 20 is a perspective view of a housing of a second actuator according to an example embodiment in the present disclosure.
Figure 20:
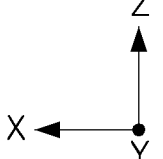
Figure 21:
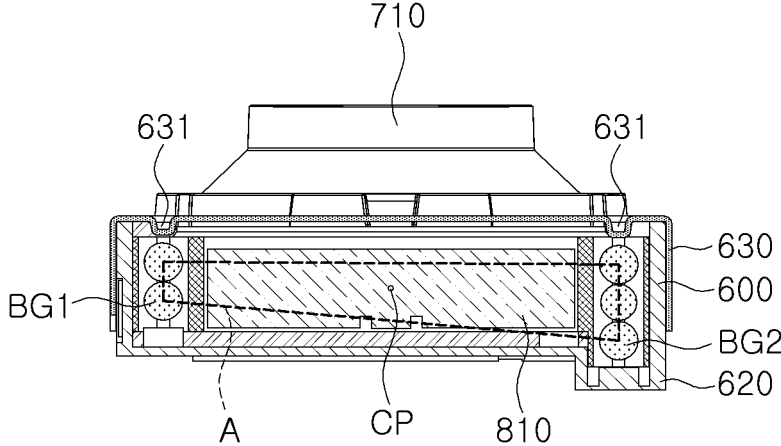
FIG. 21 is a cross-sectional view taken along line III-III' of FIG. 18.

In addition, FIG. 19 is a side view of a carrier of a second actuator according to an example embodiment in the present disclosure, FIG. 20 is a perspective view of a housing of a second actuator according to an example embodiment in the present disclosure, and FIG. 21 is a cross-sectional view taken along line III-III' of FIG. 18.

Figure 22:
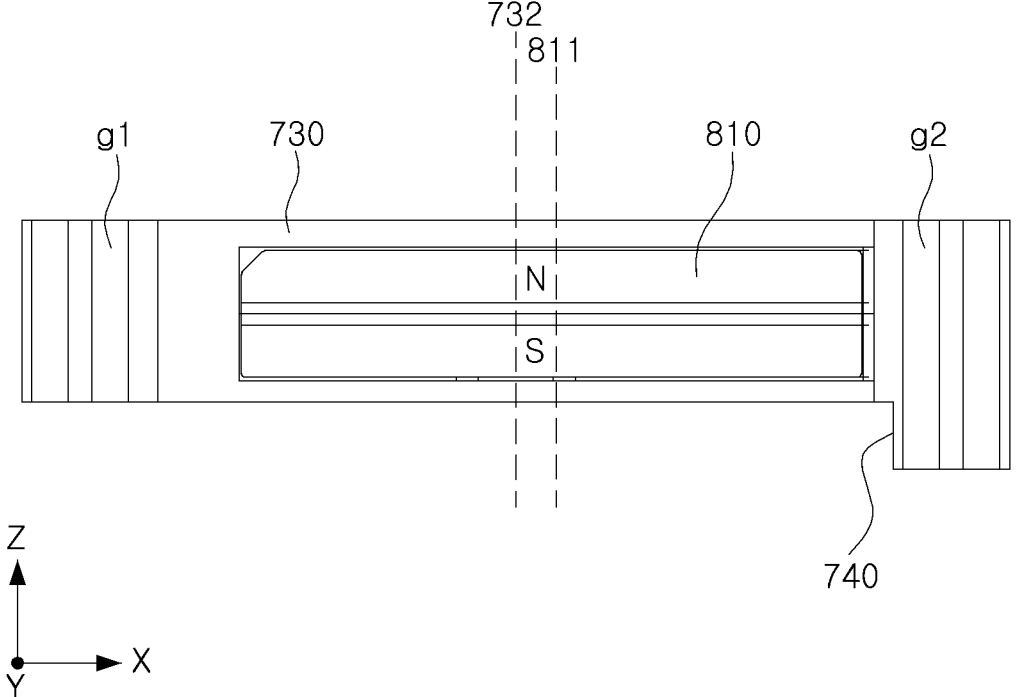
FIG. 22 is a modified example of a position of a magnet mounted on a carrier according to an example embodiment in the present disclosure.
Figure 23:
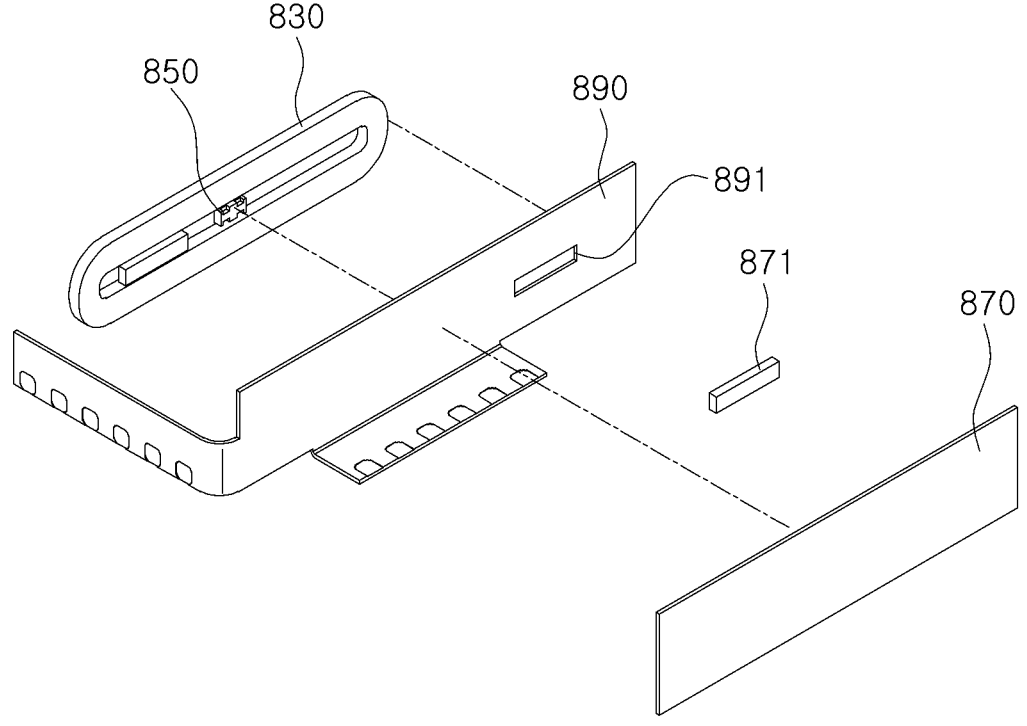
FIG. 23 is a view illustrating a configuration in which an auxiliary yoke is disposed according to an example embodiment in the present disclosure.

In addition, FIG. 22 is a modified example of a position of a magnet mounted on a carrier according to an example embodiment in the present disclosure, and FIG. 23 is a view illustrating a configuration in which an auxiliary yoke is disposed according to an example embodiment in the present disclosure.

The movement of the carrier 730 in the optical axis (Z-axis) direction will be described with reference to FIGS. 17 through 23.

First, referring to FIG. 17, the second actuator 20 may further include a carrier 730, a housing 600, and a second driving unit 800, and may further include a case 630.

The carrier 730 may have a hollow portion penetrating through the carrier 730 in the optical axis (Z-axis) direction, the lens barrel 710 may be inserted into the hollow portion and fixed with respect to the carrier 730. Accordingly, the lens barrel 710 and the carrier 730 may be moved together in the optical axis (Z-axis) direction.

The housing 600 may have an internal space, and may have a rectangular box shape with open top and bottom. The carrier 730 is disposed in the internal space of the housing 600.

The case 630 may be coupled to the housing 600 to protect an internal configuration of the second actuator 20.

The case 630 may include a protrusion 631 protruding toward a second ball member B2 to be described later. The protrusion 631 may serve as a stopper and a buffer member for regulating a movement range of the second ball member B2.

The second driving unit 800 may generate driving force in the optical axis (Z-axis) direction to move the carrier 730 in the optical axis (Z-axis) direction.

The second driving unit 800 includes a third magnet 810 and a third coil 830. The third magnet 810 and the third coil 830 may be disposed to face each other in a direction perpendicular to the optical axis (the Z-axis).

The third magnet 810 is disposed on the carrier 730. For example, the third magnet 810 may be disposed on one side of the carrier 730.

A back yoke may be disposed between the carrier 730 and the third magnet 810. The back yoke may improve driving force by preventing leakage of the magnetic flux of the third magnet 810.

The third magnet 810 may be magnetized so that one surface (e.g., a surface facing the third coil 830) has both an N-pole and an S-pole. For example, an N-pole, a neutral region, and an S-pole may be sequentially provided on the one surface of the third magnet 810 facing the third coil 830 in the optical axis (Z-axis) direction.

The other surface (e.g., the opposite surface of the one surface) of the third magnet 810 may be magnetized to have both an S-pole and an N-pole. For example, an S-pole, a neutral region, and an N-pole may be sequentially provided on the other surface of the third magnet 810 in the optical axis (Z-axis) direction.

The third coil 830 is disposed to face the third magnet 810. For example, the third coil 830 may be disposed to face the third magnet 810 in a direction perpendicular to the optical axis (the Z-axis).

The third coil 830 is disposed on a substrate 890, and the substrate 890 is mounted in the housing 600 so that the third magnet 810 and the third coil 830 face each other in a direction perpendicular to the optical axis (the Z-axis).

The third magnet 810 is a moving member mounted on the carrier 730 and moving in the optical axis (Z-axis) direction together with the carrier 730, and the third coil 830 is a fixed member fixed to the substrate 890.

When power is applied to the third coil 830, the carrier 730 may be moved in the optical axis (Z-axis) direction by electromagnetic force between the third magnet 810 and the third coil 830.

Since the lens barrel 710 is disposed on the carrier 730, the lens barrel 710 is also moved in the optical axis (Z-axis) direction by the movement of the carrier 730.

The second ball member B2 is disposed between the carrier 730 and the housing 600. The second ball member B2 includes a plurality of balls arranged in the optical axis (Z-axis) direction. The plurality of balls may be rolled in the optical axis (Z-axis) direction when the carrier 730 is moved in the optical axis (Z-axis) direction.

A third yoke 870 is disposed in the housing 600. The third yoke 870 may be disposed at a position facing the third magnet 810. For example, the third coil 830 may be disposed on one surface of the second substrate 890, and the third yoke 870 may be disposed on the other surface of the second substrate 890.

The third magnet 810 and the third yoke 870 may generate attractive force between each other. For example, attractive force acts between the third magnet 810 and the third yoke 870 in a direction perpendicular to the optical axis (the Z-axis).

Due to the attractive force of the third magnet 810 and the third yoke 870, the second ball member B2 may be in contact with each of the carrier 730 and the housing 600.

A guide recess may be disposed on surfaces of the carrier 730 and the housing 600 facing each other. For example, a third guide recess 731 may be provided in the carrier 730, and a fourth guide recess 610 may be provided in the housing 600.

The third guide recess 731 and the fourth guide recess 610 extend in the optical axis (Z-axis) direction. The second ball member B2 is disposed between the third guide recess 731 and the fourth guide recess 610.

The third guide recess 731 includes a first groove g1 and a second groove g2, and the fourth guide recess 610 includes a third groove g3 and a fourth groove g4. Each recess is formed to extend to be elongated in the optical axis (Z-axis) direction.

The first groove g1 and the third groove g3 are disposed to face each other in a direction perpendicular to the optical axis (Z-axis) direction, and some (e.g., a first ball group BG1 to be described later) of the plurality of balls of the second ball member B2 are disposed in a space between the first groove g1 and the third groove g3.

Among a plurality of balls included in the first ball group BG1, the balls located at outermost sides in a direction parallel to the optical axis (the Z-axis) may be in two-point contact with any one of the first groove g1 and the third groove g3 and may be in one-point contact with the other.

For example, among the plurality of balls included in the first ball group BG1, the balls located at the outermost sides in a direction parallel to the optical axis (the Z-axis) may be in one-point contact with the first groove g1 and may be in two-point contact with the third groove g3 (and vice versa). The first ball group BG1, the first groove g1, and the third groove g3 may function as auxiliary guides supporting the movement of the lens module 20 in the optical axis (Z-axis) direction.

The second groove g2 and the fourth groove g4 are disposed to face each other in a direction perpendicular to the optical axis (Z-axis) direction, and some (e.g., a second ball group BG2 to be described later) of the plurality of balls of the second ball member B2 are disposed in a space between the second groove g2 and the fourth groove g4.

Among a plurality of balls included in the second ball group BG2, the balls located at outermost sides in a direction parallel to the optical axis (the Z-axis) may be in two-point contact with each of the second groove g2 and the fourth groove g4.

That is, among the plurality of balls included in the second ball group BG2, the balls located at the outermost sides in the direction parallel to the optical axis (the Z-axis) may be in two-point contact with the second groove g2 and may be in two-point contact with the fourth groove g4.

The second ball group BG2, the second groove g2, and the fourth groove g4 may function as a main guide for guiding movement of the lens module 20 in the optical axis (Z-axis) direction.

The second ball member B2 includes the first ball group BG1 and the second ball group BG2, and the first ball group BG1 and the second ball group BG2 include a plurality of balls arranged in the optical axis (Z-axis) direction, respectively.

The first ball group BG1 and the second ball group BG2 are spaced apart from each other in a direction perpendicular to the optical axis (the Z-axis) (e.g., the X-axis direction). The number of balls in the first ball group BG1 may be different from the number of balls in the second ball group BG2 (refer to FIG. 17).

For example, the second ball group BG2 includes three or more balls arranged in the optical axis (Z-axis) direction, and the first ball group BG1 includes a number of balls less than the number of balls included in the second ball group BG2.

The number of balls belonging to each ball member may be changed on the premise that the number of balls belonging to the first ball group BG1 is different from the number of balls belonging to the second ball group BG2. Hereinafter, for convenience of description, an example embodiment in which the first ball group BG1 includes two balls and the second ball group BG2 includes three balls will be described.

Among the three balls included in the second ball group BG2, two balls disposed on the outermost sides in a direction parallel to the optical axis (the Z-axis) have the same diameter, and one ball disposed therebetween may have a diameter smaller than that of the balls disposed on the outermost sides.

For example, among the plurality of balls included in the second ball group BG2, two balls disposed on the outermost sides in a direction parallel to the optical axis (the Z-axis) have a first diameter, the one ball disposed therebetween has a second diameter, and the first diameter is greater than the second diameter.

The two balls included in the first ball group BG1 may have the same diameter. For example, two balls included in the first ball group BG1 have a third diameter.

Also, the first diameter and the third diameter may be the same. Here, the same diameter may mean to include a case of not only physically the same but also manufacturing errors.

A distance between the centers of the balls disposed on the outermost sides in a direction parallel to the optical axis (the Z-axis) among the plurality of balls included in the second ball group BG2 and a distance between the centers of the balls disposed on the outermost sides in a direction parallel to the optical axis (the Z-axis) among the plurality of balls included in the first ball group BG1 are different.

For example, a distance between the centers of two balls having the first diameter is greater than a distance between the centers of two balls having the third diameter.

In order for the carrier 730 to be moved in parallel to the optical axis (Z-axis) direction (that is, to prevent the occurrence of tilting) when the carrier 730 is moved in the optical axis (Z-axis) direction, a center point CP of action of attractive force acting between the third magnet 810 and the third yoke 870 needs to be positioned in a support region A formed by connecting contact points of the second ball member B2 and the carrier 730 (or the housing 600).

When the center point CP of action of attractive force deviates from the support region A, the carrier 730 may be out of position to cause tilting. Therefore, it is necessary to form the support region A as wide as possible.

In one example embodiment in the present disclosure, the size (e.g., a diameter) of some of the plurality of balls of the second ball member B2 is formed smaller than the size (e.g., a diameter) of the remaining balls. In this case, balls having a large size among the plurality of balls may be intentionally brought into contact with the carrier 730 or the housing 600.

Referring to FIG. 21, since the diameter of two balls among the three balls of the second ball group BG2 is larger than the diameter of the remaining one ball, the two balls of the second ball group BG2 are in contact with each of the carrier 730 and the housing 600. Also, since the two balls of the first ball group BG1 have the same diameter, the two balls of the first ball group BG1 are in contact with each of the carrier 730 and the housing 600.

Accordingly, as illustrated in FIG. 21, when viewed from the second axis (Y-axis) direction, the second ball member B2 is in four-point contact with the carrier 730 (or the housing 600). In addition, the support region A formed by connecting the contact points to each other may have a rectangular shape (e.g., a trapezoidal shape).

Accordingly, the support region A may be formed to be relatively large, and accordingly, the center point CP of action of attractive force acting between the third magnet 810 and the third yoke 870 may be stably positioned in the support region A. Therefore, driving stability at the time of focus adjustment may be ensured.

Meanwhile, even if the two balls of the first ball group BG1 are manufactured to have the same diameter, the two balls of the first ball group BG1 may not physically have the same diameter due to manufacturing errors, etc., and in this case, any one of the two balls of the first ball group BG1 may contact the carrier 730 (or the housing 600).

Accordingly, the support region A formed by connecting the contact points at which the second ball member B2 is in contact with the carrier 730 (or the housing 600) may have a triangular shape.

Even if the support region A has a triangular shape, the support region A may be formed to be wide by the balls located on the outermost sides in a direction parallel to the optical axis (the Z-axis) among the three balls of the second ball group BG2, and thus, driving stability during focus adjustment may be secured.

Apart from securing driving stability during focus adjustment, reducing a height of the camera module 1 in the optical axis (Z-axis) direction (that is, slimming) is also an important issue. When the height of the camera module 1 in the optical axis (Z-axis) direction is simply reduced, a height of the support region A in the optical axis (Z-axis) direction may also be reduced.

Therefore, simply reducing the height of the camera module 1 in the optical axis (Z-axis) direction may cause a problem in driving stability during focus adjustment.

Accordingly, in the camera module 1 according to an example embodiment in the present disclosure, lengths of the first groove g1 and the second groove g2 in the optical axis (Z-axis) direction are configured to be different. For example, the length of the second groove g2 in the optical axis (Z-axis) direction is longer than the length of the first groove g1 in the optical axis (Z-axis) direction.

Referring to FIG. 19, the second groove g2 may protrude from a lower surface of the carrier 730 in the optical axis (Z-axis) direction. For example, a first extension 740 protruding downwardly in the optical axis (Z-axis) direction may be disposed on the lower surface of the carrier 730. The length of the second groove g2 may be longer than the length of the first groove g1 due to the first extension 740.

Also, lengths of the third groove g3 and the fourth groove g4 in the optical axis (Z-axis) direction may also be different. For example, the length of the fourth groove g4 in the optical axis (Z-axis) direction is longer than the length of the third groove g3 in the optical axis (Z-axis) direction.

In addition, the fourth groove g4 may protrude from the lower surface of the housing 600 in the optical axis (Z-axis) direction. For example, a second extension 620 protruding downwardly in the optical axis (Z-axis) direction may be disposed on the lower surface of the housing 600. The length of the fourth groove g4 may be longer than the length of the third groove g3 due to the second extension 620.

The second extension 620 may have an accommodation space for accommodating the first extension 740, and at least a portion of the first extension 740 may be accommodated in the second extension 620.

The first extension 740 and the second extension 620 have surfaces facing each other in a direction perpendicular to the optical axis (the Z-axis), and some of the plurality of balls included in the second ball member B2 may be disposed between the first extension 740 and the second extension 620. For example, among the three balls of the second ball group BG2, a ball located at the lowermost position in a direction parallel to the optical axis (the Z-axis) may be disposed between the first extension 740 and the second extension 620.

Accordingly, in one example embodiment in the present disclosure, the number of the plurality of balls belonging to the first ball group BG1 and the number of the plurality of balls belonging to the second ball group BG2 are configured to be different, while lengths of the spaces in which the respective ball groups are accommodated are formed to be different, so that the size of the support region A is prevented from being changed or the center point of action of attractive force may not deviate from the support region A even if the size of the support region A is changed.

In addition, among the main guide and the auxiliary guide, the lengths of the second grooves g2 and the fourth grooves g4 corresponding to the main guides are longer than the lengths of the first grooves g1 and the third grooves g3, and thus, the size of the support region A may be increased.

In addition, an escape region may be provided in the fixed frame 100 of the first actuator 10 to secure a space in which the first extension 740 and the second extension 620 may protrude.

That is, the fixed frame 100 may be provided with a first accommodating portion 140, and the first accommodating portion 140 may have a shape of a groove or a shape of a hole penetrating through the fixed frame 100 in the optical axis (Z-axis) direction.

In addition, when the first actuator 10 and the second actuator 20 are coupled, the first extension 740 and the second extension 620 may be located in the first accommodating portion 140.

Accordingly, even when the first extension 740 protrudes from the lower surface of the carrier 730 of the second actuator 20 and the second extension 620 protrudes from the lower surface of the housing 600, the protruded portions are disposed in the first actuator 10, and as a result, the height of the overall camera module 1 may not be increased.

Meanwhile, the second actuator 20 may detect the position of the carrier 730 in the optical axis (Z-axis) direction.

To this end, a third position sensor 850 is provided. The third position sensor 850 is disposed on the second substrate 890 to face the third magnet 810. The third position sensor 850 may be a Hall sensor.

Meanwhile, in one example embodiment, the third magnet 810 may be disposed so that the center point CP of action of attractive force generated between the third magnet 810 and the third yoke 870 is located closer to the main guide than the auxiliary guide.

For example, referring to FIG. 22, on one side of the carrier 730, the third magnet 810 may be disposed to be eccentric toward either side of the third magnet 810 in a length direction (e.g., the first axis direction (X-axis direction).

A center 732 of one side of the carrier 730 and a center 811 of the third magnet 810 may not be aligned. A direction in which the third magnet 810 is eccentric may be toward the main guide.

That is, the third magnet 810 may be disposed closer to the main guide than the auxiliary guide.

Since the support region A is formed to have a longer length in the optical axis (Z-axis) direction toward the main guide, the center point CP of action of attractive force may be positioned in the support region A more stably by disposing the third magnet 810 closer to the main guide.

In one example embodiment, an auxiliary yoke 871 may be disposed at a position facing the third magnet 810. For example, the auxiliary yoke 871 may be disposed on the substrate 890 to face the third magnet 810.

Referring to FIG. 23, as another example embodiment, the substrate 890 may be provided with a guide hole 891 penetrating through the substrate 890, and the auxiliary yoke 871 may be disposed in the guide hole 891 to be disposed to directly face the third magnet 810.

The auxiliary yoke 871 may be located closer to the main guide than the auxiliary guide. The auxiliary yoke 871 is formed of a material capable of generating attractive force with respect to the third magnet 810.

Therefore, a resultant force of attractive force acting between the third magnet 810 and the third yoke 870 and attractive force generated between the third magnet 810 and the auxiliary yoke 871 may be located closer to the main guide than the auxiliary guide.

In the camera module 1 according to an example embodiment in the present disclosure, the lens module 700 is configured to move in the optical axis (Z-axis) direction during autofocusing adjustment, and the image sensor S is configured to move in a direction perpendicular to the optical axis (the Z-axis) during OIS.

Therefore, even if the lens module 700 is moved in the optical axis (Z-axis) direction during focus adjustment, the relative positions of the magnets and the coils of the first driving unit 300 do not change, and thus, driving force for OIS may be precisely controlled.

In addition, even when the image sensor S is moved in a direction perpendicular to the optical axis during OIS, the relative positions of the magnet and the coil of the second driving unit 800 do not change, and thus, driving force for focus adjustment may be precisely controlled.

Hereinafter, a camera module 1' according to another example embodiment in the present disclosure will be described with reference to FIGS. 24 to 38.

Figure 24:
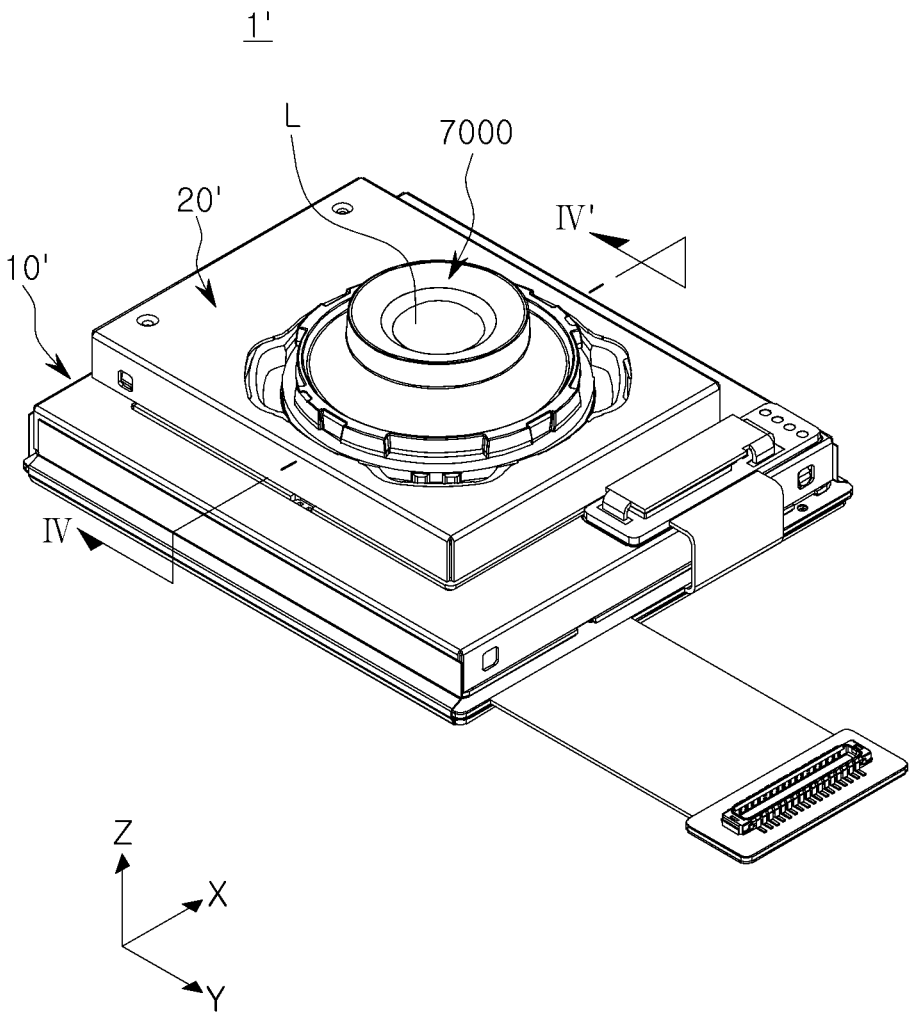
FIG. 24 is a perspective view of a camera module according to another example embodiment in the present disclosure.
Figure 26:
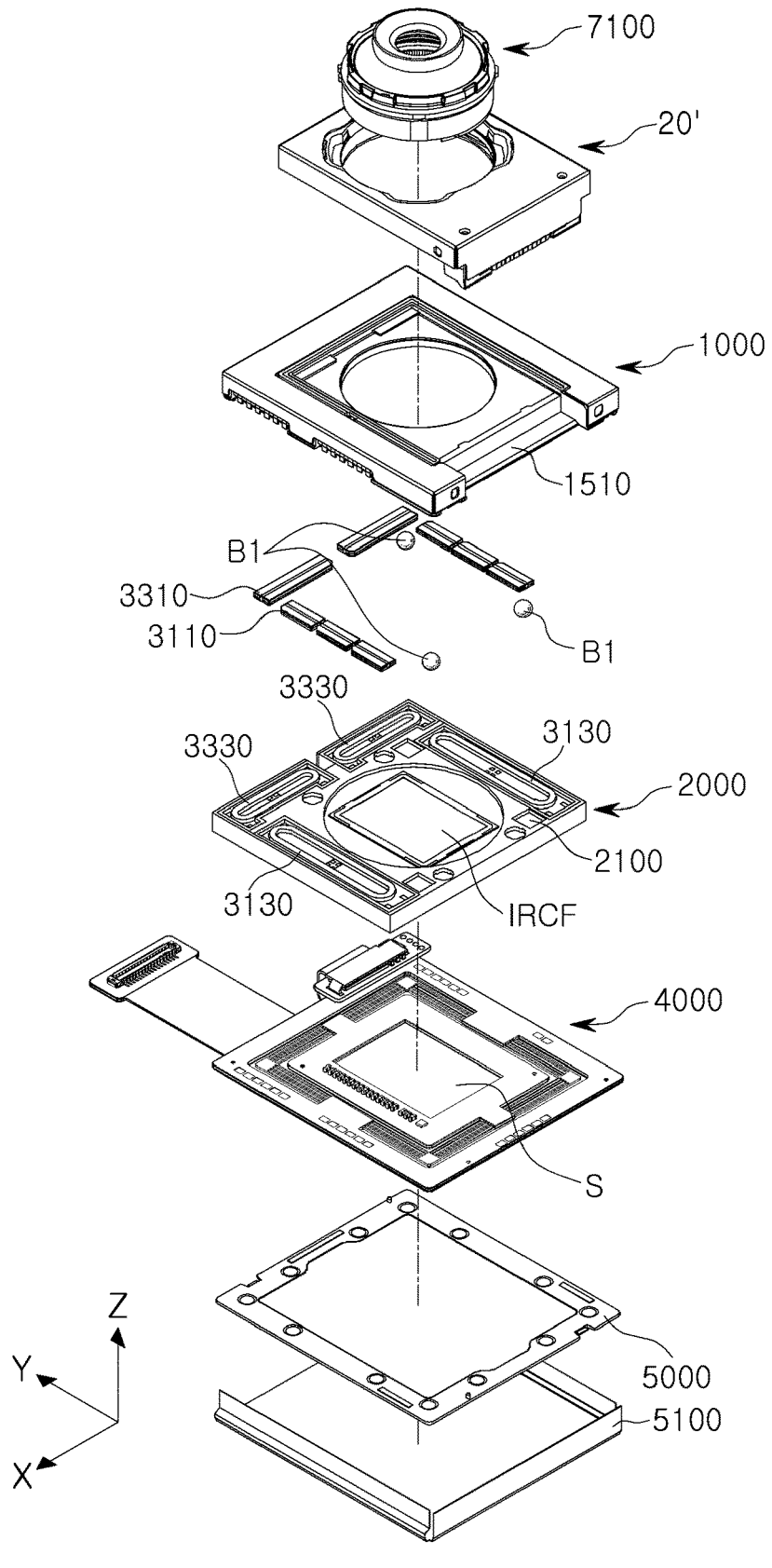
FIG. 26 is a schematic exploded perspective view of a camera module according to another example embodiment in the present disclosure.
Figure 27:
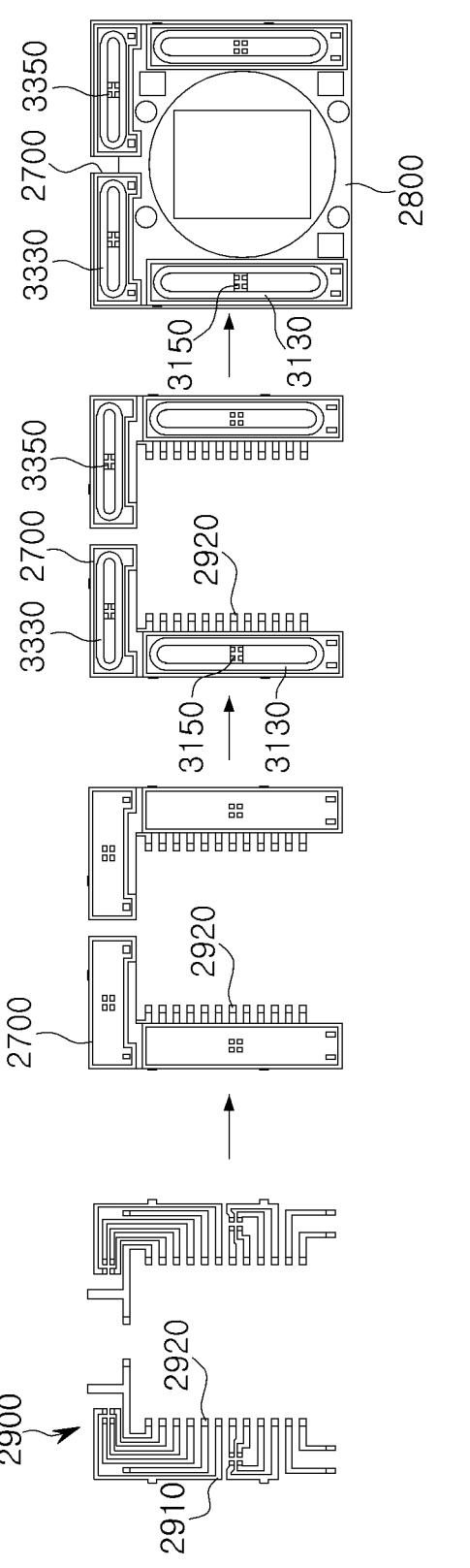
FIG. 27 is a view illustrating a manufacturing process of a moving frame according to another example embodiment in the present disclosure.
Figure 28:
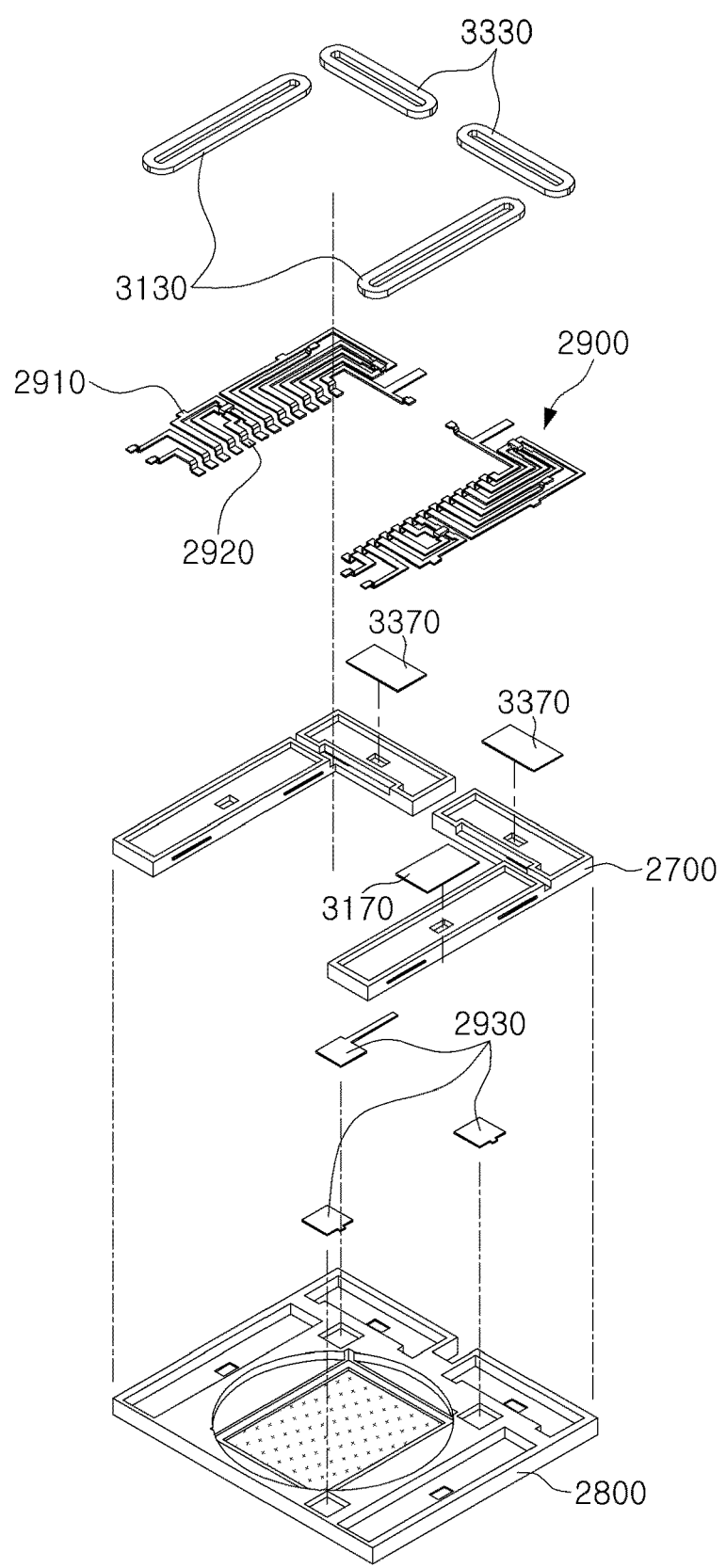
FIG. 28 is an exploded perspective view of a moving frame according to another example embodiment in the present disclosure.
Figure 29:
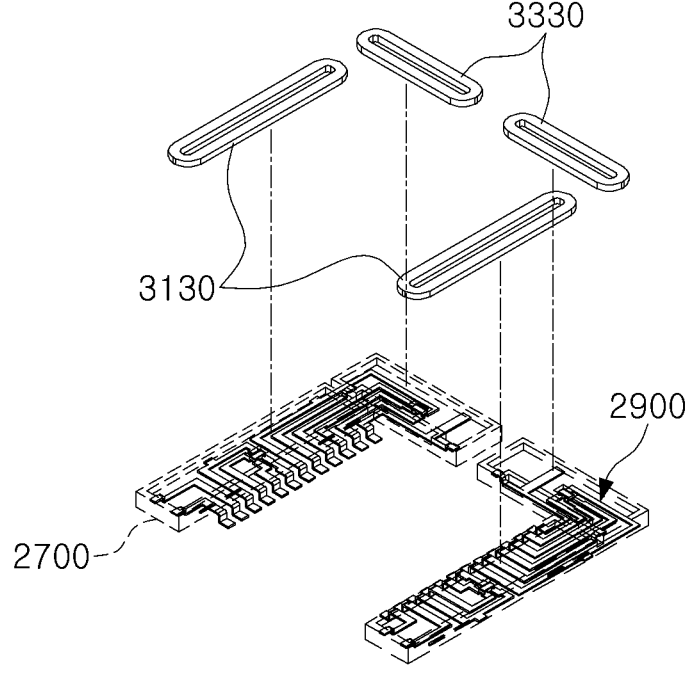
FIGS. 29 and 30 are partially exploded perspective views of a moving frame according to another example embodiment in the present disclosure.
Figure 30:
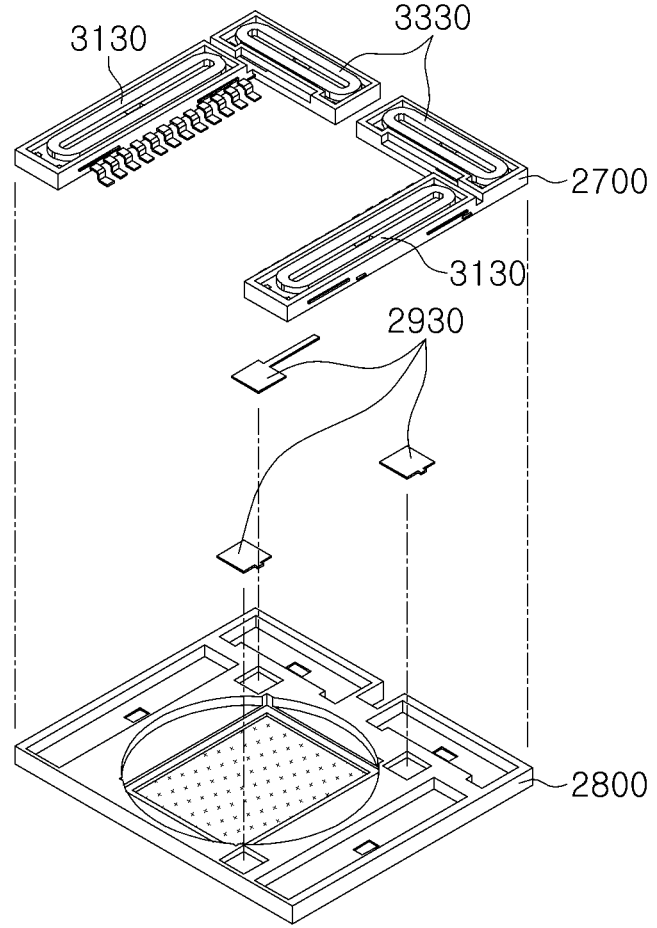
Figure 31:
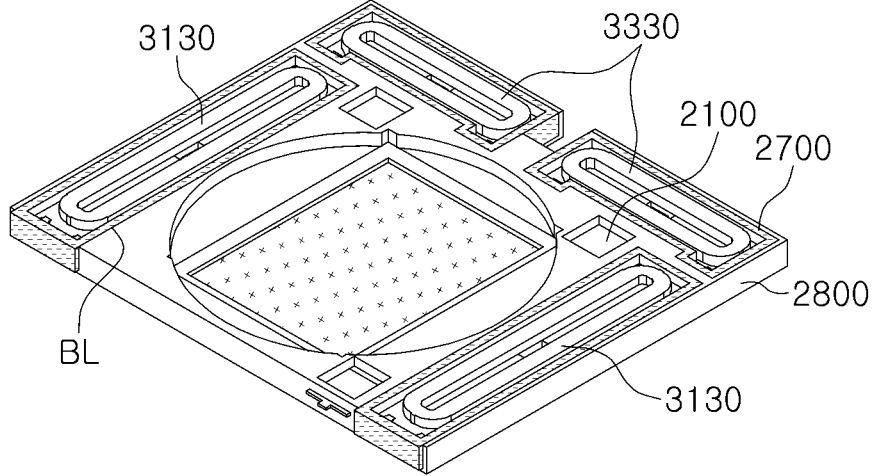
FIG. 31 is a perspective view of a moving frame according to another example embodiment in the present disclosure.

Referring to FIGS. 24 and 26, a camera module 1' according to another example embodiment in the present disclosure includes a lens module 7000, an image sensor S, a first actuator 10', and a second actuator 20'.

The first actuator 10' is an actuator for OIS, and the second actuator 20' is an actuator for focus adjustment.

The lens module 7000 includes at least one lens L and a lens barrel 7100. The at least one lens is disposed inside of the lens barrel 7100. When a plurality of lenses L are provided, the plurality of lenses L are mounted inside the lens barrel 7100 in the optical axis (the Z-axis).

The lens module 7000 may further include a carrier 7300 coupled to the lens barrel 7100.

The carrier 7300 may be provided with a hollow portion penetrating through the carrier 7300 in the optical axis (Z-axis) direction, the lens barrel 7100 is inserted into the hollow portion to be fixed with respect to the carrier 7300.

In one example embodiment in the present disclosure, the lens module 7000 is a moving member moved in the optical axis (Z-axis) direction during autofocusing (AF) adjustment. To this end, the camera module 1' according to another example embodiment in the present disclosure includes the second actuator 20'.

The lens module 7000 may be moved in the optical axis (Z-axis) direction by the second actuator 20' to adjust the focus.

Meanwhile, the lens module 7000 is a fixed member that does not move during OIS.

The camera module 1' according to another example embodiment in the present disclosure may perform OIS by moving the image sensor S instead of the lens module 7000. Since the relatively light image sensor S is moved, the image sensor S may be moved with a smaller driving force. Accordingly, OIS may be performed more precisely.

To this end, the camera module 1' according to another example embodiment in the present disclosure includes the first actuator 10'.

The image sensor S may be moved in a direction perpendicular to the optical axis (the Z-axis) or rotated based on the optical axis (the Z-axis) as a rotation axis by the first actuator 10' to perform OIS.

That is, by the first actuator 10', the image sensor S may be moved in a direction perpendicular to the direction in which an imaging surface of the image sensor S faces. For example, the image sensor S may be moved in a direction perpendicular to the optical axis (the Z-axis) or rotated based on the optical axis (the Z-axis) as a rotation axis to perform OIS.

For convenience, it is described that the image sensor S is rotated about the optical axis (the Z-axis) as a rotation axis, but when the image sensor S is rotated, a rotation axis thereof may not match the optical axis (the Z-axis). For example, the image sensor S may be rotated based on any one axis parallel to the direction in which the imaging surface of the image sensor S faces as a rotation axis.

Referring to FIG. 26, the first actuator 10' may further include a fixed frame 1000, a moving frame 2000, a first driving unit 3000, and a sensor substrate 4000, and may further include a base 5000.

The fixed frame 1000 is coupled to the second actuator 20' to be described later. For example, the fixed frame 1000 may be coupled to a housing 6000 of the second actuator 20'.

The fixed frame 1000 is a fixed member that does not move during focus adjustment and OIS.

The fixed frame 1000 may have a square plate shape having a center penetrated in the optical axis (Z-axis) direction.

The moving frame 2000 is accommodated in the fixed frame 1000. The fixed frame 1000 may have a sidewall extending downwardly in the optical axis (Z-axis) direction, and accordingly, the fixed frame 1000 may have an accommodating space for accommodating the moving frame 2000.

The moving frame 2000 may be relatively moved in a direction perpendicular to the optical axis (the Z-axis) with respect to the fixed frame 1000 or may be rotated based on optical axis (the Z-axis) as a rotation axis. That is, the moving frame 2000 is a moving member that is moved during OIS.

For example, the moving frame 2000 may be configured to be movable in the first axis (X-axis) direction and the second axis (Y-axis) direction, and may be rotated based on the optical axis (the Z-axis) as a rotation axis.

The first axis (X-axis) direction may refer to a direction perpendicular to the optical axis (the Z-axis), and the second axis (Y-axis) direction may refer to a direction perpendicular to both the optical axis (Z-axis) direction and the first axis (X-axis) direction.

The moving frame 2000 may have a square plate shape with a center penetrated in the optical axis (Z-axis) direction.

An infrared cut filter (IRCF) may be mounted on an upper surface of the moving frame 2000. The sensor substrate 4000 may be mounted on the lower surface of the moving frame 2000.

A first ball member B1 is disposed between the fixed frame 1000 and the moving frame 2000.

The first ball member B1 is disposed to contact each of the fixed frame 1000 and the moving frame 2000.

When the moving frame 2000 is moved or rotated relative to the fixed frame 1000, the first ball member B1 rolls between the fixed frame 1000 and the moving frame 2000 to support movement of the moving frame 2000.

Referring to FIG. 26, the image sensor S is mounted on the sensor substrate 4000. A portion of the sensor substrate 4000 is coupled to the moving frame 2000. In addition, another portion of the sensor substrate 4000 may be coupled to the fixed frame 1000. As another example, the other portions of the sensor substrate 4000 may also be coupled to the base 5000.

The image sensor S is mounted on a portion of the sensor substrate 4000 coupled to the moving frame 2000.

Since a portion of the sensor substrate 4000 is coupled to the moving frame 2000, as the moving frame 2000 is moved or rotated, a portion of the sensor substrate 4000 may also be moved or rotated together with the moving frame 2000.

Accordingly, the image sensor S may be moved or rotated in a plane perpendicular to the optical axis (the Z-axis) to perform OIS during image capturing.

The first driving unit 3000 may generate driving force in a direction perpendicular to the optical axis (the Z-axis) to move the moving frame 2000 in a direction perpendicular to the optical axis (the Z-axis) or rotate the moving frame 2000 based on the optical axis (the Z-axis) as a rotation axis.

The first driving unit 3000 includes a first sub-driving unit 3100 and a second sub-driving unit 3300. The first sub-driving unit 3100 may generate driving force in the first axis (X-axis) direction, and the second sub-driving unit 3300 may generate driving force in the second axis (Y-axis) direction.

The first sub-driving unit 3100 includes a first magnet 3110 and a first coil 3130. The first magnet 3110 and the first coil 3130 may be disposed to face each other in the optical axis (Z-axis) direction.

The first magnet 3110 is disposed on the fixed frame 1000. The first magnet 3110 may include a plurality of magnets. For example, the first magnet 3110 may include two sets of magnets spaced apart from each other in a direction (the first axis (X-axis) direction) in which driving force is generated by the first magnet 3110. At least two magnets may be included in each set. The magnets included in each set may be spaced apart from each other in the second axis (Y-axis) direction.

It is also possible to use one magnet extending in the second axis (Y-axis) direction, but if the magnet is too long to one side, there may be a risk of damage during manufacturing. Thus, a plurality of magnets spaced apart from each other in the length direction may be disposed as a set to improve reliability during manufacturing.

The fixed frame 1000 may include a mounting groove in which the first magnet 3110 is disposed. By inserting and disposing the first magnet 3110 in the mounting groove, it is possible to prevent an increase in the overall height of the first actuator 10' and the camera module 1' due to a thickness of the first magnet 3110.

The first magnet 3110 may be magnetized so that one surface (e.g., a surface facing the first coil 3130) has both an N-pole and an S-pole. For example, on the one surface of the first magnet 3110 facing the first coil 3130, an N-pole, a neutral region, and an S-pole may be sequentially provided in the first axis (X-axis) direction. The first magnet 3110 has a length in the second axis (Y-axis) direction (refer to FIG. 33).

The other surface (e.g., the opposite surface of one surface) of the first magnet 3110 may be magnetized to have both an S-pole and an N-pole. For example, on the other surface of the first magnet 3110, an S-pole, a neutral region, and an N-pole may be sequentially provided in the first axis (X-axis) direction.

Magnetization directions of the polarities of the plurality of magnets included in the first magnet 3110 may all be the same.

The first coil 3130 is disposed to face the first magnet 3110. For example, the first coil 3130 may be disposed to face the first magnet 3110 in the optical axis (Z-axis) direction.

The first coil 3130 has a hollow donut shape and has a length in the second axis (Y-axis) direction. The first coil 3130 includes the number of coils less than the number of magnets included in the first magnet 3110. For example, the first coil 3130 may include two coils spaced apart from each other in a direction (the first axis (X-axis) direction) in which driving force is generated, and each coil may be disposed to face the magnets of each set of the first magnet 3110.

During OIS, the first magnet 3110 is a fixed member fixed to the fixed frame 1000, and the first coil 3130 is a moving member mounted on the moving frame 2000 and moving together with the moving frame 2000.

When power is applied to the first coil 3130, the moving frame 2000 may be moved in the first axis (X-axis) direction by electromagnetic force between the first magnet 3110 and the first coil 3130.

The first magnet 3110 and the first coil 3130 may generate driving force in a direction (e.g., the first axis (X-axis) direction) perpendicular to a direction (the optical axis direction) facing each other.

The second sub-driving unit 3300 includes a second magnet 3310 and a second coil 3330. The second magnet 3310 and the second coil 3330 may be disposed to face each other in the optical axis (Z-axis) direction.

The second magnet 3310 is disposed on the fixed frame 1000. The second magnet 3310 may include a plurality of magnets. For example, the second magnet 3310 may include two magnets, and the two magnets may be spaced apart from each other in the first axis (X-axis) direction. For example, the second magnet 3310 may include two magnets spaced apart from each other in a direction perpendicular to a direction (the second axis (Y-axis) direction) in which driving force is generated by the second magnet 3310.

The fixed frame 1000 may include a mounting groove in which the second magnet 3310 is disposed. By inserting and disposing the second magnet 3310 into the mounting groove, it is possible to prevent an increase in the overall height of the first actuator 10' and the camera module 1' due to a thickness of the second magnet 3310.

The second magnet 3310 may be magnetized so that one surface (e.g., a surface facing the second coil 3330) has both an S-pole and an N-pole. For example, an S-pole, a neutral region, and an N-pole may be sequentially provided on the one surface of the second magnet 3310 facing the second coil 3330 in the second axis (Y-axis) direction (refer to FIG. 33). The second magnet 3310 has a shape having a length in the first axis (X-axis) direction.

The other surface (e.g., the opposite surface of the one surface) of the second magnet 3310 may be magnetized to have both an N-pole and an S-pole. For example, on the other surface of the second magnet 3310, an N-pole, a neutral region, and an S-pole may be sequentially provided in the second axis (Y-axis) direction.

Magnetization directions of the two magnets of the second magnet 3310 may be opposite to each other.

The second coil 3330 is disposed to face the second magnet 3310. For example, the second coil 3330 may be disposed to face the second magnet 3310 in the optical axis (Z-axis) direction.

The second coil 3330 has a hollow donut shape, and has a length in the first axis (X-axis) direction. The second coil 3330 includes the number of coils corresponding to the number of magnets included in the second magnet 3310.

During OIS, the second magnet 3310 is a fixed member fixed to the fixed frame 1000, and the second coil 3330 is a moving member mounted on the moving frame 2000 and moving together with the moving frame 2000.

When power is applied to the second coil 3330, the moving frame 2000 may be moved in the second axis (Y-axis) direction by electromagnetic force between the second magnet 3310 and the second coil 3330.

The second magnet 3310 and the second coil 3330 may generate driving force in a direction (e.g., the second axis (Y-axis) direction) perpendicular to a direction (the optical axis direction) facing each other.

Meanwhile, the moving frame 2000 may be rotated by the first sub-driving unit 3100 and the second sub-driving unit 3300.

For example, rotational force may be generated by controlling the driving force of the first sub-driving unit 3100 and the driving force of the second sub-driving unit 3300, and accordingly, the moving frame 2000 may be rotated.

The first magnet 3110 and the second magnet 3310 are disposed perpendicular to each other in a plane perpendicular to the optical axis (the Z-axis), and the first coil 3130 and the second coil 3330 are also disposed to be perpendicular to each other in a plane perpendicular to the optical axis (the Z-axis).

The first ball member B1 is disposed between the fixed frame 1000 and the moving frame 2000.

The first ball member B1 is disposed to contact each of the fixed frame 1000 and the moving frame 2000.

The first ball member B1 functions to guide movement of the moving frame 2000 during an OIS process. In addition, the first ball member B1 also functions to maintain an interval between the fixed frame 1000 and the moving frame 2000.

The first ball member B1 performs a rolling motion in the first axis (X-axis) direction when driving force in the first axis (X-axis) direction is generated. Accordingly, the first ball member B1 guides movement of the moving frame 2000 in the first axis (X-axis) direction.

In addition, when the driving force in the second axis (Y-axis) direction is generated, the first ball member B1 rolls in the second axis (Y-axis) direction. Accordingly, the first ball member B1 guides the movement of the moving frame 2000 in the second axis (Y-axis) direction.

The first ball member B1 includes a plurality of balls disposed between the fixed frame 1000 and the moving frame 2000.

A guide recess in which the first ball member B1 is disposed is provided on at least one of the surfaces of the fixed frame 1000 and the moving frame 2000 facing each other in the optical axis (Z-axis) direction. A plurality of guide recesses are provided to correspond to the plurality of balls of the first ball member B1.

For example, a first guide recess may be provided on a lower surface of the fixed frame 1000, and a second guide recess 2100 may be provided on an upper surface of the moving frame 2000.

The first ball member B1 is disposed in the first guide recess and the second guide recess 2100 to be fitted between the fixed frame 1000 and the moving frame 2000.

The first guide recess and the second guide recess 2100 may each have a polygonal or circular planar shape. The sizes of the first guide recess and the second guide recess 2100 are larger than a diameter of the first ball member B1. For example, cross-sections of the first guide recess and the second guide recess 2100 on a plane perpendicular to the optical axis (the Z-axis) may have a size greater than the diameter of the first ball member B1.

A specific shape of the first guide recess and the second guide recess 2100 is not limited as long as the size is larger than the diameter of the first ball member B1.

Accordingly, the first ball member B1 may perform a rolling motion in a direction perpendicular to the optical axis (the Z-axis) in the state accommodated in the first guide recess and the second guide recess 2100.

Meanwhile, the fixed frame 1000 and the moving frame 2000 may include a support pad, respectively, and at least a portion of the support pad may form a bottom surface of the first guide recess and the second guide recess 2100. Accordingly, the first ball member B1 may roll in contact with the support pad.

The support pad may be integrally coupled to the fixed frame 1000 and the moving frame 2000 by insert injection. In this case, by injecting a resin material into a mold in a state in which the support pad is fixed in the mold, the support pad may be manufactured to be integrated with the fixed frame 1000 and the moving frame 2000.

The support pad may be formed of a non-magnetic metal (e.g., stainless steel).

When driving force is generated in the first axis (X-axis) direction, the moving frame 2000 is moved in the first axis (X-axis) direction.

In addition, when driving force is generated in the second axis (Y-axis) direction, the moving frame 2000 is moved in the second axis (Y-axis) direction.

In addition, the moving frame 2000 may be rotated by generating a deviation in a magnitude of the driving force in the first axis (X-axis) direction and a magnitude of the driving force in the second axis (Y-axis) direction.

A portion of the sensor substrate 4000 is coupled to the moving frame 2000 and the image sensor S is disposed on the sensor substrate 4000. As a result, as the moving frame 2000 is moved, the image sensor S may also be moved or rotated.

Figure 25:
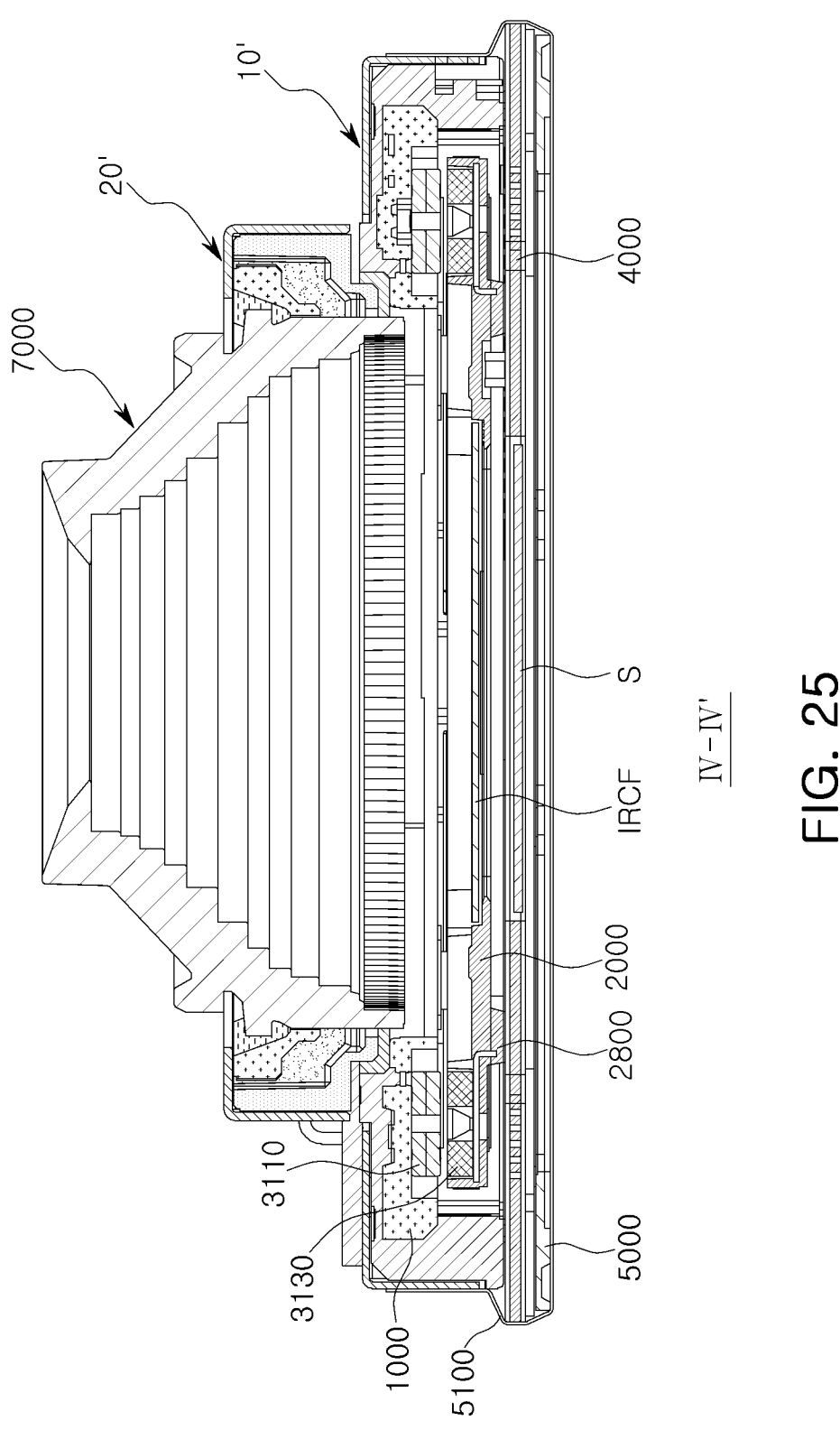
FIG. 25 is a cross-sectional view taken along line IV-IV' of FIG. 24.

Meanwhile, referring to FIG. 25, a protrusion 2800 protruding toward the sensor substrate 4000 may be disposed on the moving frame 2000. For example, the protrusion 2800 may be disposed on a lower surface of the moving frame 2000, and the protrusion 2800 may be coupled to a moving portion 4100 of the sensor substrate 4000. Accordingly, a gap is formed between the body of the moving frame 2000 and the sensor substrate 4000 in the optical axis (Z-axis) direction, and accordingly, when the moving frame 2000 is moved on an X-Y plane, the moving frame 2000 may be prevented from being interfered with the sensor substrate 4000.

In FIG. 25, the protrusion 2800 is disposed on a lower surface of the moving frame 2000, but this is only an example, and the protrusion 2800 may be disposed on an upper surface of the sensor substrate 4000.

The first actuator 10' may detect a position in a direction perpendicular to the optical axis (the Z-axis) of the moving frame 2000.

To this end, a first position sensor 3150 and a second position sensor 3350 are provided. The first position sensor 3150 is disposed on the moving frame 2000 to face the first magnet 3110, and the second position sensor 3350 is disposed on the moving frame 2000 to face the second magnet 3310. The first position sensor 3150 and the second position sensor 3350 may be Hall sensors.

The second position sensor 3350 may include two Hall sensors. For example, the second magnet 3310 includes two magnets spaced apart from each other in a direction (the first axis (X-axis) direction) perpendicular to a direction (the second axis (Y-axis) direction) in which driving force is generated by the second magnet 3310, and the second position sensor 3350 includes two Hall sensors facing the two magnets.

Whether the moving frame 2000 is rotated may be detected through two Hall sensors facing the second magnet 3310.

Meanwhile, rotational force may be generated on purpose by generating a deviation between the driving force of the first sub-driving unit 3100 and the driving force of the second sub-driving unit 3300, by using the resultant force of the first sub-driving unit 3100 and the second sub-driving unit 3300, or by using two magnets and two coils included in the second sub-driving unit 3300.

Since the first guide recess and the second guide recess 2100 have a polygonal or circular planar shape larger than the diameter of the first ball member B1, the first ball member B1 disposed between the first guide recess and the second guide recess 2100 may perform a rolling motion in the direction perpendicular to the optical axis (the Z-axis) without limitation.

Accordingly, the moving frame 2000 may be rotated based on the Z-axis in a state supported by the first ball member B1.

In addition, when rotation is not required and linear movement is required, rotational force that is unintentionally generated may be offset by controlling the driving force of the first sub-driving unit 3100 and/or the driving force of the second sub-driving unit 3300.

Referring to FIGS. 27 through 32, the first coil 3130 and the second coil 3330 are disposed on the moving frame 2000, and a wiring pattern 2900 is disposed inside of the moving frame 2000. The wiring pattern 2900 may be connected to the first coil 3130 and the second coil 3330. Also, the wiring pattern 2900 of the moving frame 2000 may be connected to the sensor substrate 4000. Accordingly, the first coil 3130 and the second coil 3330 may receive power through the wiring pattern 2900 disposed on the moving frame 2000.

That is, the camera module 1' does not have a separate printed circuit board (PCB) for supplying power to the first driving unit 3000, and the moving frame 2000 itself has the wiring pattern 2900 to supply power to the first driving unit 3000.

The wiring pattern 2900 may be integrally coupled to the moving frame 2000 by insert injection. For example, by injecting a resin material into the mold while the wiring pattern 2900 is disposed in the mold, the wiring pattern 2900 may be manufactured to be integrated with the moving frame 2000.

Injection may be performed at least twice in the process of manufacturing the moving frame 2000.

If a pattern width of the wiring pattern 2900 is minimized to reduce the size, the rigidity of the wiring pattern 2900 may not be sufficient, so that it may be difficult to fix a position of the wiring pattern 2900 during insert injection.

Therefore, a primary injection molding product (for example, a first frame 2700) integrated with the wiring pattern 2900 may be manufactured by insert injection, and then the primary injection molding product may be insert-injected to manufacture a secondary injection molding product (for example, a second frame 2800), thereby manufacturing the moving frame 2000 having the wiring pattern 2900 therein.

Since at least two injections are performed, a boundary line BL is formed between the first frame 2700 that is the primary injection molding product and the second frame 2800 that is the secondary injection molding product.

The first frame 2700 and the second frame 2800 are each formed of a plastic material. In addition, the plastic material of the first frame 2700 and the plastic material of the second frame 2800 may be the same or different.

The wiring pattern 2900 may be disposed inside of the first frame 2700 and inside the second frame 2800, and a portion of the wiring pattern 2900 may be exposed to the outside of the first frame 2700, and another portion of the wiring pattern 2900 may be exposed to the outside of the second frame 2800. The portion of the wiring pattern 2900 exposed to the outside of the first frame 2700 may be connected to the first coil 3130 and the second coil 3330, and the other portion of the wiring pattern 2900 exposed to the outside of the second frame 2800 may be connected to the sensor substrate 4000.

The first coil 3130, the second coil 3330, the first position sensor 3150, and the second position sensor 3350 are mounted on the first frame 2700, which is the primary injection molding product. The first coil 3130, the second coil 3330, the first position sensor 3150, and the second position sensor 3350 are connected to the wiring pattern 2900 provided in the first frame 2700.

The wiring pattern 2900 includes a wiring portion 2910 and a terminal portion 2920.

A portion of the wiring portion 2910 is exposed to an upper surface of the moving frame 2000, and the remaining portion of the wiring portion 2910 is disposed inside of the moving frame 2000. Also, the terminal portion 2920 is exposed to a lower surface of the moving frame 2000.

For example, a portion of the wiring portion 2910 is exposed to an upper surface of the first frame 2700, and the remaining portion is located inside the first frame 2700. In addition, the remaining portion of the wiring portion 2910 may extend to the inside of the second frame 2800 to be positioned.

The terminal portion 2920 is disposed to be exposed to the outside of the first frame 2700. Also, the terminal portion 2920 is disposed to be exposed to the outside of the second frame 2800.

Since the terminal portion 2920 of the wiring pattern 2900 is connected to the sensor substrate 4000, power may be applied to the first coil 3130 and the second coil 3330 through the wiring pattern 2900.

Meanwhile, the second guide recess 2100 in which the first ball member B1 is disposed is formed in the second frame 2800. Since a material of the first ball member B1 may be ceramic and a material of the second frame 2800 is plastic, there is a risk that the second guide recess 2100 may be damaged due to a difference in rigidity.

Therefore, in order to prevent damage to the second guide recess 2100, a support pad 2930 is disposed in the second guide recess 2100, and the support pad 2930 may be insert-injected during the secondary injection process to be integrated with the second frame 2800.

The support pad 2930 is disposed inside of the second frame 2800, and one surface of the support pad 2930 may be exposed to the outside of the second frame 2800 to contact the first ball member B1.

The support pad 2930 may be formed of a non-magnetic metal (e.g., stainless steel).

The support pad 2930 may form a bottom surface of the second guide recess 2100. Accordingly, the first ball member B1 may roll in contact with the support pad 2930.

A first yoke 3170 and a second yoke 3370 are disposed inside of the moving frame 2000. The first yoke 3170 and the second yoke 3370 provide attractive force so that the fixed frame 1000 and the moving frame 2000 may maintain a contact state with the first ball member B1.

The first yoke 3170 and the second yoke 3370 may be insert-injected in the same manner as the wiring pattern 2900 during the primary injection process to be integrated with the first frame 2700.

The first yoke 3170 and the second yoke 3370 are disposed to face the first magnet 3110 and the second magnet 3310, respectively, in the optical axis (Z-axis) direction.

The first coil 3130 and the wiring pattern 2900 may be located between the first magnet 3110 and the first yoke 3170, and the second coil 3330 and the wiring pattern 2900 may be located between the second magnet 3310 and the second yoke 3370.

At least a portion of each of the first yoke 3170 and second yoke 3370 may be disposed inside of the first frame 2700.

Attractive force acts between the first yoke 3170 and the first magnet 3110 and between the second yoke 3370 and the second magnet 3310 in the optical axis (Z-axis) direction.

Accordingly, since the moving frame 2000 is pressed in a direction toward the fixed frame 1000, the fixed frame 1000 and the moving frame 2000 may maintain contact with the first ball member B1.

The first yoke 3170 and the second yoke 3370 are formed of a material capable of generating attractive force between the first magnet 3110 and the second magnet 3310. For example, the first yoke 3170 and the second yoke 3370 are provided as magnetic members.

The number of the first yoke 3170 and the second yoke 3370 is not particularly limited, but the center point of action of the attractive force acting between the first magnet 3110 and the first yoke 3170 and between the second magnet 3310 and the second yoke 3370 should be located in a support region connecting the plurality of balls included in the first ball member B1 to each other.

Meanwhile, the first actuator 10' may include the configuration of the damping unit 170 described above with reference to FIGS. 14 and 15.

Figure 34:
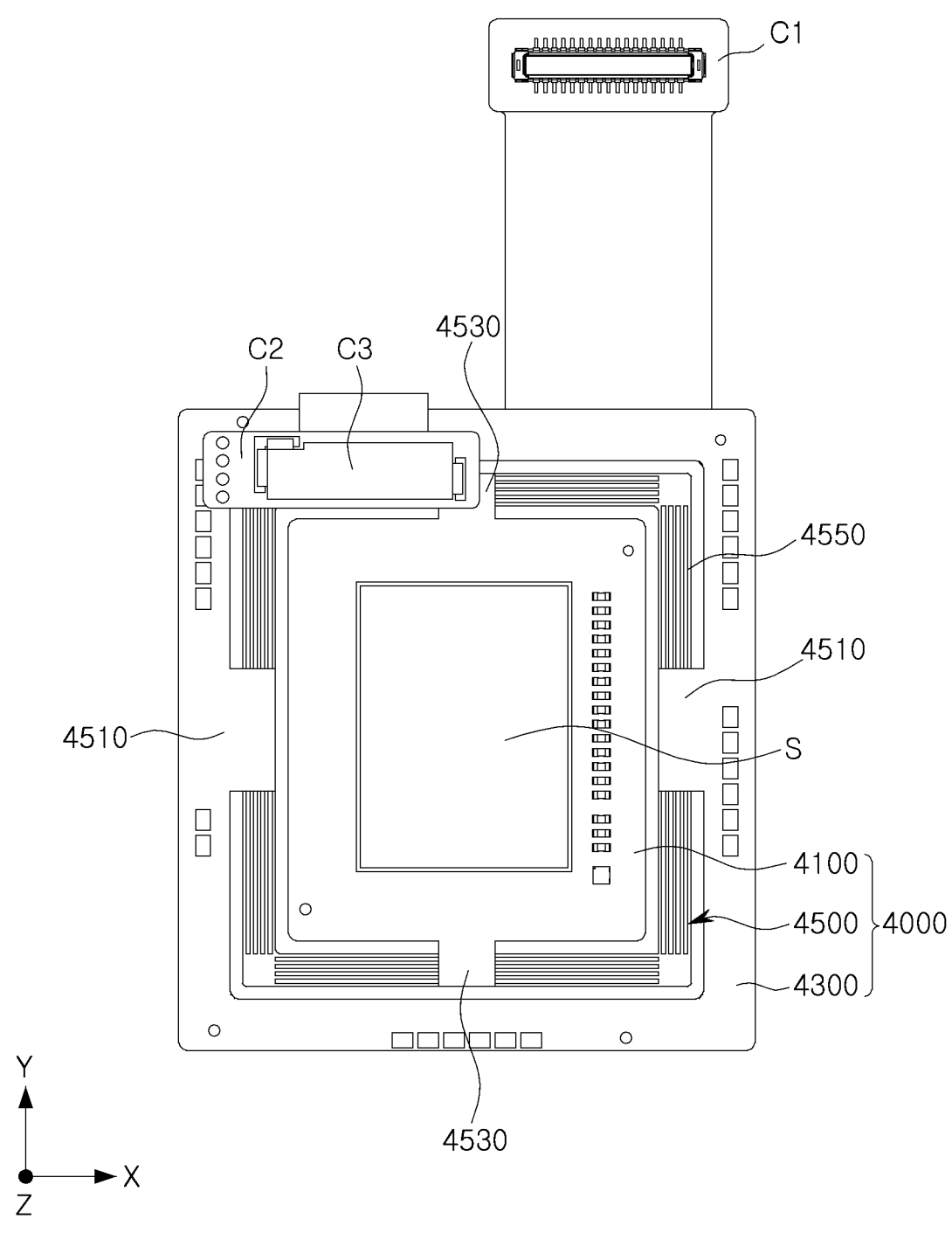
FIGS. 34 and 35 are plan views of a sensor substrate of a first actuator according to another example embodiment in the present disclosure.
Figure 35:
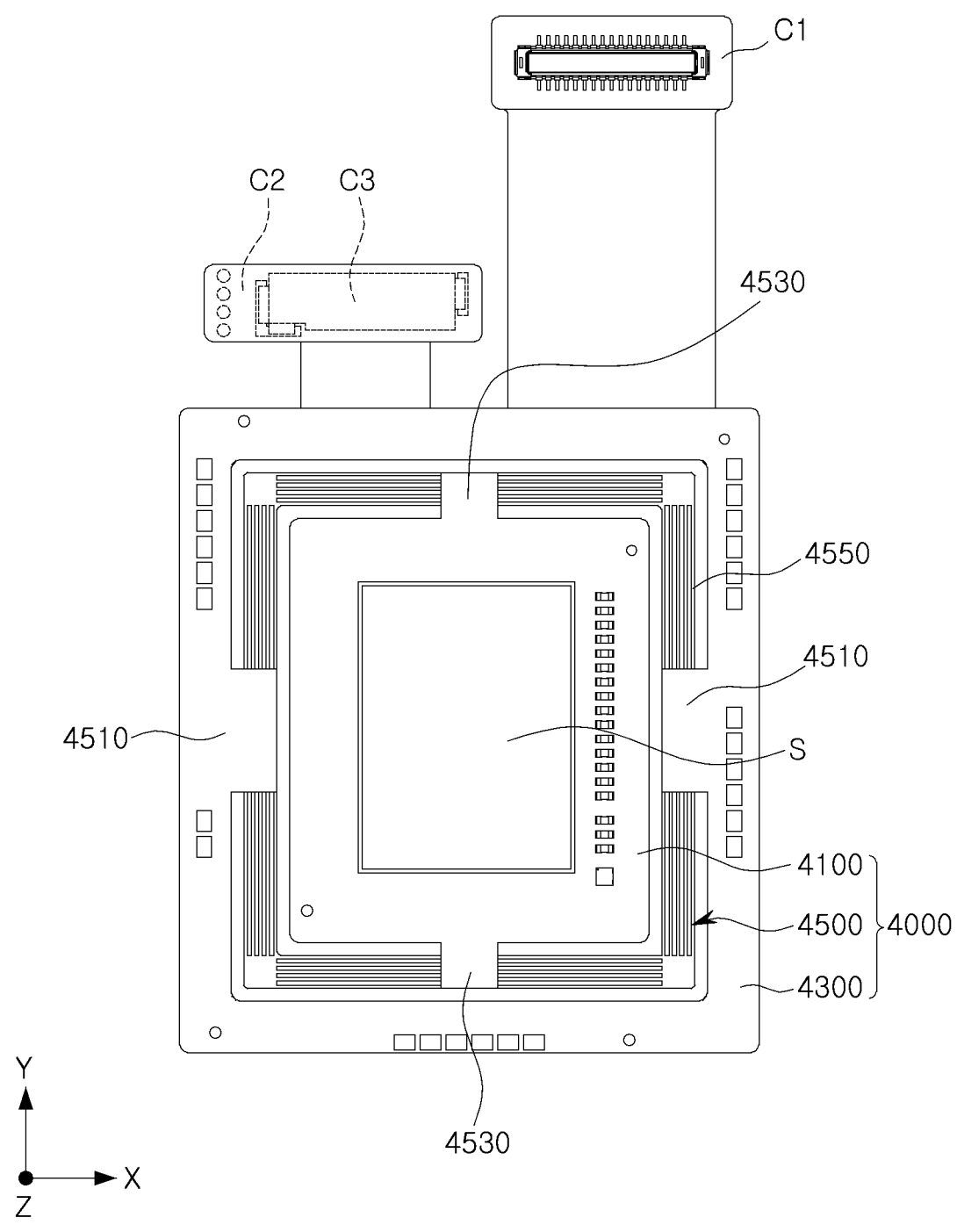

Referring to FIGS. 34 and 35, the sensor substrate 4000 includes a moving portion 4100, a fixed portion 4300, and a connection portion 4500. The sensor substrate 4000 may be an RF PCB.

The moving portion 4100 is equipped with an image sensor S. The moving portion 4100 is coupled to a lower surface of the moving frame 2000. For example, the area of the moving portion 4100 is larger than the area of the image sensor S, and the moving portion 4100 at an outer portion of the image sensor S may be coupled to a lower surface of the moving frame 2000.

The moving portion 4100 is a moving member that moves together with the moving frame 2000 during OIS. The moving portion 4100 may be a rigid PCB.

The fixed portion 4300 is coupled to a lower surface of the fixed frame 1000. The fixed portion 4300 is a fixing member that does not move during OIS. The fixed portion 4300 may be a rigid PCB.

The connection portion 4500 is disposed between the moving portion 4100 and the fixed portion 4300, and may connect the moving portion 4100 and the fixed portion 4300. The connection portion 4500 may be a flexible PCB. When the moving portion 4100 is moved, the connection portion 4500 disposed between the moving portion 4100 and the fixed portion 4300 may be bent.

The connection portion 4500 extends along the circumference of the moving portion 4100. The connection portion 4500 is provided with a plurality of slits penetrating through the connection portion 4500 in the optical axis direction. The plurality of slits are disposed at an interval between the moving portion 4100 and the fixed portion 4300. Accordingly, the connection portion 4500 may include a plurality of bridge elements 4550 spaced apart by the plurality of slits. The plurality of bridge elements 4550 extend along the circumference of the moving portion 4100. Each bridging element may have a width smaller than a thickness thereof.

The connection portion 4500 includes a first support portion 4510 and a second support portion 4530. The connection portion 4500 is connected to the fixed portion 4300 through the first support portion 4510. In addition, the connection portion 4500 is connected to the moving portion 4100 through the second support portion 4530.

For example, the first support portion 4510 is connected to and in contact with the fixed portion 4300 and is spaced apart from the moving portion 4100. In addition, the second support portion 4530 is connected to and in contact with the moving portion 4100 and is spaced apart from the fixed portion 4300.

For example, the first support portion 4510 may extend in the first axis direction (the X-axis direction) to connect the plurality of bridges 4550 of the connection portion 4500 and the fixed portion 4300. In an example embodiment, the first support portion 4510 may include two support portions disposed opposite to each other in the first axis direction (the X-axis direction).

The second support portion 4530 may extend in the second axis direction (the Y-axis direction) to connect the plurality of bridges 4550 of the connection portion 4500 and the moving portion 4100. In an example embodiment, the second support portion 4530 may include two support portions disposed opposite to each other in the second axis direction (the Y-axis direction).

Accordingly, the moving portion 4100 may be moved in a direction perpendicular to the optical axis (the Z-axis) or rotated based on the optical axis (the Z-axis), while being supported by the connection portion 4500.

In an example embodiment, when the image sensor S is moved in the first axis direction (the X-axis direction), the plurality of bridges 4550 connected to the first support portion 4510 may be bent. Also, when the image sensor S is moved in the second axis direction (the Y-axis direction), the plurality of bridges 4550 connected to the second support portion 4530 may be bent. Also, when the image sensor S is rotated, the plurality of bridges 4550 connected to the first support portion 4510 and the plurality of bridges 4550 connected to the second support portion 4530 may be bent together.

In an example embodiment, a length of the fixed portion 4300 in the first axis (X-axis) direction may be different from a length of the fixed portion 4300 in the second axis (Y-axis) direction. For example, the length of the fixed portion 4300 in the second axis (Y-axis) direction may be longer than the length thereof in the first axis (X-axis) direction. In an example embodiment, the sensor substrate 4000 may have a rectangular shape overall.

In the sensor substrate 4000 having such a shape, if the length of the first support portion 4510 and the length of the second support portion 4530 are equal to each other, a load applied to the plurality of bridges 4550 connected to the first support portion 4510 and a load of the plurality of bridges 4550 connected to the second support portion 4530 become different, and accordingly, it may be difficult to control the driving.

Therefore, by making the length of the first support portion 4510 and the length of the second support portion 4530 different, the lengths of the plurality of bridges 4550 extending from the first support portion 4510 in the second axis (Y-axis) direction and the lengths of the plurality of bridges 4550 extending from the second support portion 4530 in the first axis (X-axis) direction may be approximately the same.

Here, the length of the first support portion 4510 may refer to a length in the second axis (Y-axis) direction, and the length of the second support portion 4530 may refer to a length in the first axis (X-axis) direction.

A driver integrated circuit (IC) C3 for controlling driving of the first driving unit 3000 may be disposed on the sensor substrate 4000. The driver IC C3 may be disposed in a connection substrate C2, and the connection substrate C2 may be connected to the fixed portion 4300 by a flexible PCB.

The driver IC C3 may be fixed to an upper surface of the fixed frame 1000. That is, since the flexible circuit board may be bent, the connection substrate C2 on which the driver IC C3 is disposed may be disposed on the upper surface of the fixed frame 1000. Accordingly, there is no need to secure a separate installation space, and thus, the overall size of the camera module 1' may be reduced.

In addition, a first connector C1 to be connected to an external power source (e.g., a portable electronic device in which the camera module 1' is mounted) may be extended and disposed on the fixed portion 4300 of the sensor substrate 4000.

Meanwhile, referring to FIGS. 25 and 26, the base 5000 may be coupled to a lower portion of the sensor substrate 4000.

The base 5000 may be coupled to the sensor substrate 4000 to cover a lower portion of the sensor substrate 4000. The base 5000 may serve to prevent an external foreign object from being introduced through a gap between the moving portion 4100 and the fixed portion 4300 of the sensor substrate 4000.

A heat dissipation film 5100 may be disposed below the base 5000, and the heat dissipation film 5100 may cover a lower portion of the base 5000 and a side surface of the first actuator 10'.

For example, the heat dissipation film 5100 may cover the lower surface of the base 5000, and may further cover at least one of the side surface of the sensor substrate 4000 and the side surface of the fixed frame 1000 if necessary.

Accordingly, heat generated by the image sensor S may be effectively dissipated.

Figure 36:
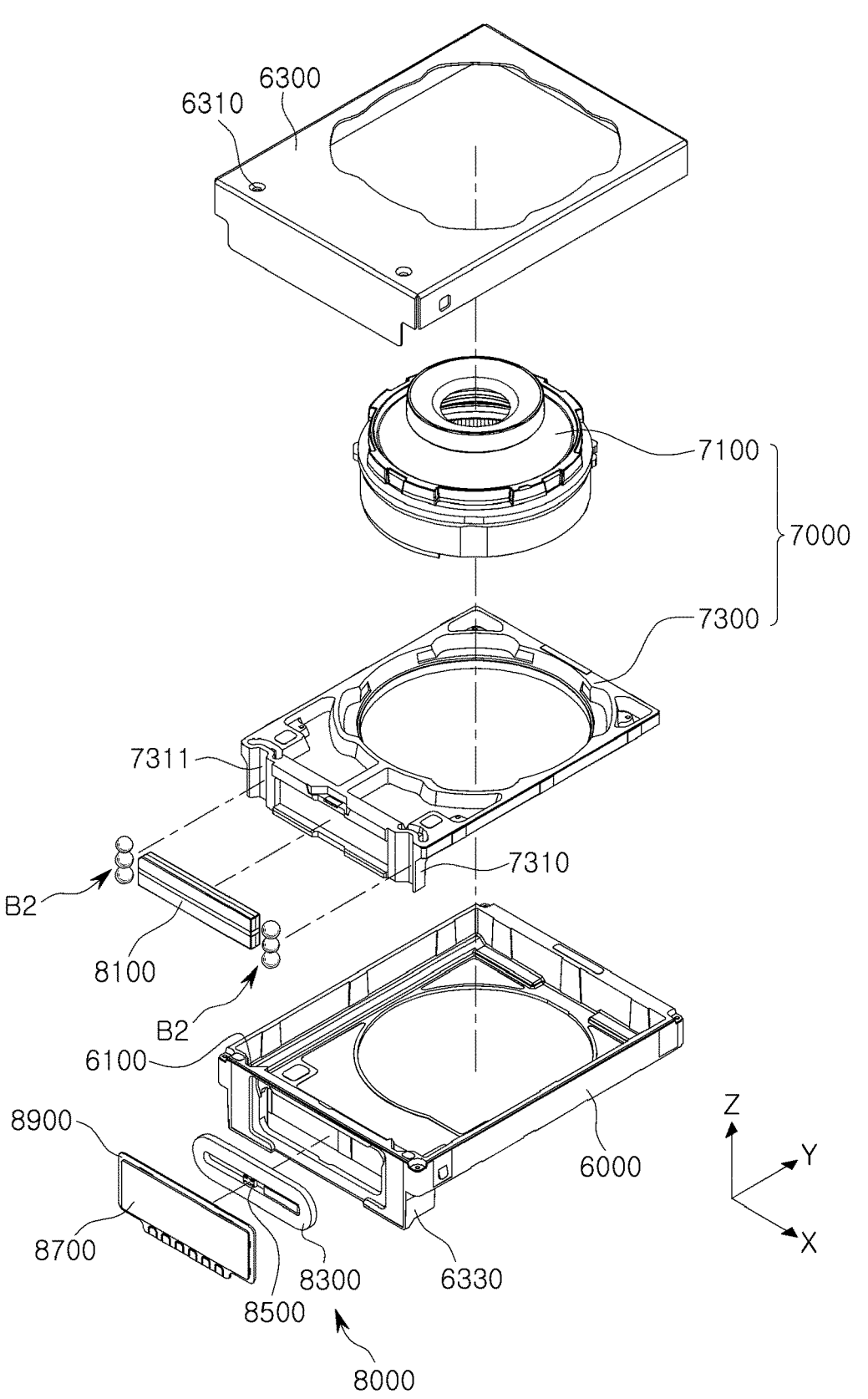
FIG. 36 is an exploded perspective view of a second actuator according to another example embodiment in the present disclosure.
Figure 37:
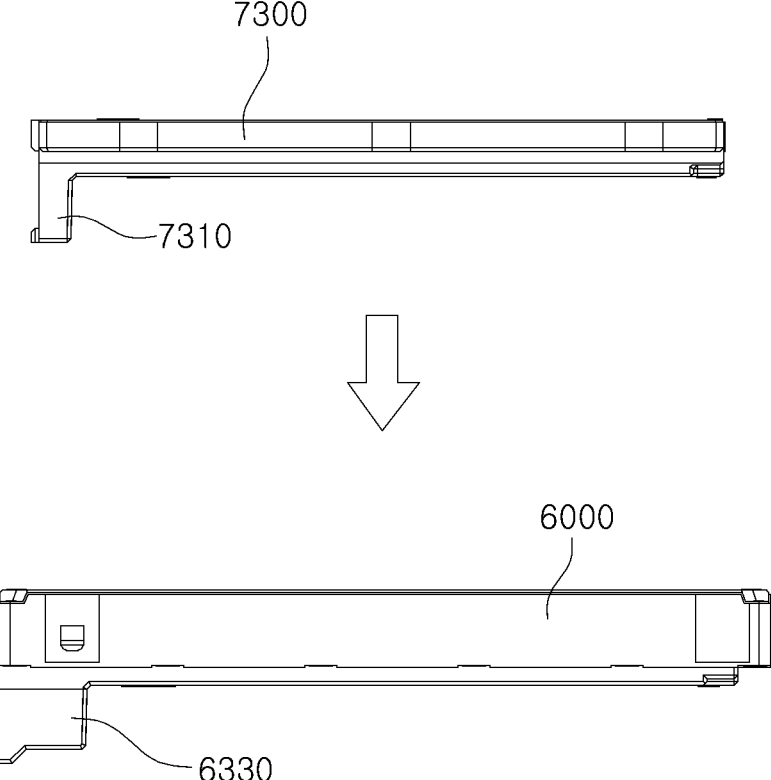
FIG. 37 is a side view of a carrier and a housing of a second actuator according to another example embodiment in the present disclosure.

The second actuator 20' will be described with reference to FIGS. 36 to 38.

Figure 32:
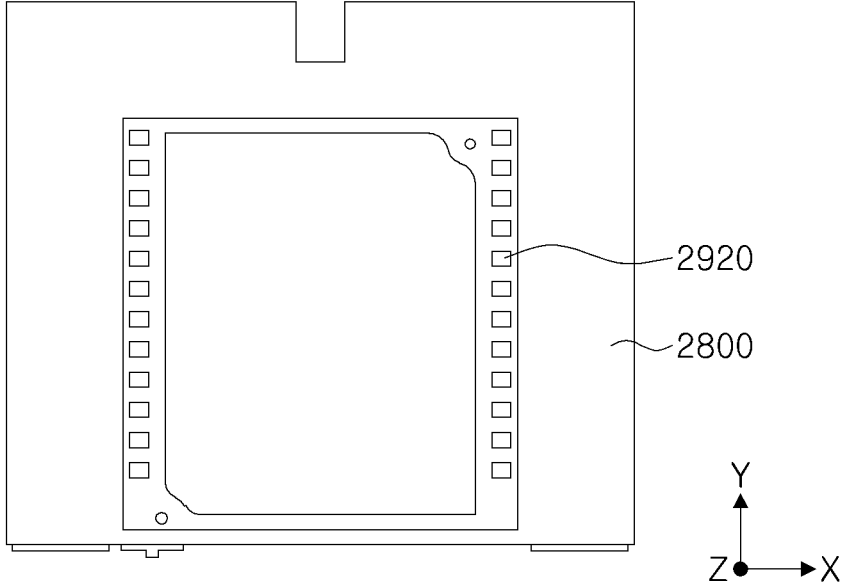
FIG. 32 is a bottom view of a moving frame according to another example embodiment in the present disclosure.
Figure 33:
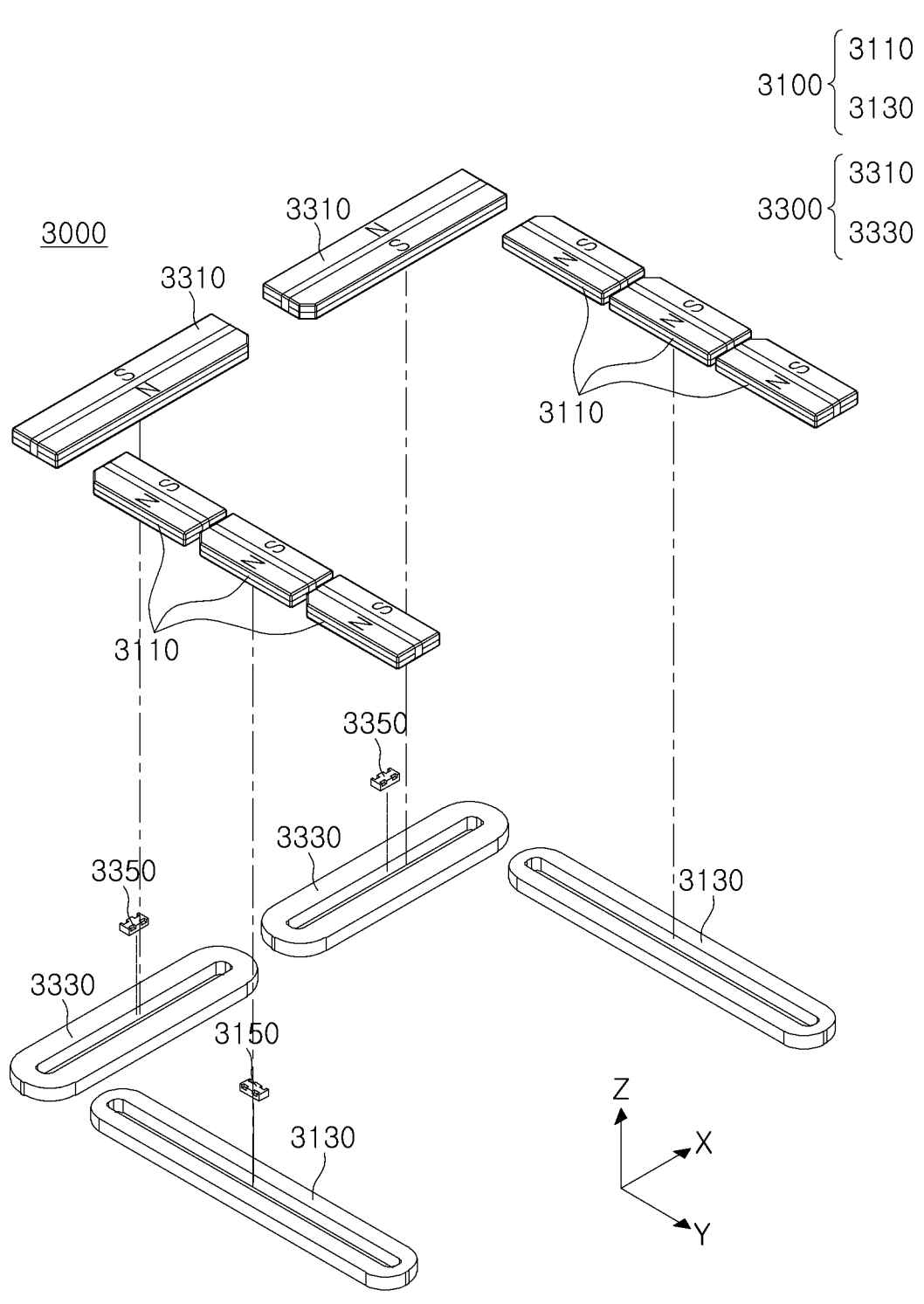
FIG. 33 is an exploded perspective view of a first driving unit of a first actuator according to another example embodiment in the present disclosure.

Referring to FIG. 32, the second actuator 20' may include a carrier 7300, a housing 6000, and a second driving unit 8000, and may further include a case 6300.

The carrier 7300 may have a hollow portion penetrating through the carrier 7300 in the optical axis (Z-axis) direction, the lens barrel 7100 may be inserted into the hollow portion and fixed with respect to the carrier 7300. Accordingly, the lens barrel 7100 and the carrier 7300 may be moved together in the optical axis (Z-axis) direction.

The housing 6000 may have an internal space, and may have a rectangular box shape with open top and bottom. The carrier 7300 is disposed in the internal space of the housing 6000.

The case 6300 may be coupled to the housing 6000 to protect an internal configuration of the second actuator 20'.

The case 6300 may include a protrusion 6310 protruding toward a second ball member B2 to be described later. The protrusion 6310 may serve as a stopper and a buffer member for regulating a movement range of the second ball member B2.

The second driving unit 8000 may generate driving force in the optical axis (Z-axis) direction to move the carrier 7300 in the optical axis (Z-axis) direction.

The second driving unit 8000 includes a third magnet 8100 and a third coil 8300. The third magnet 8100 and the third coil 8300 may be disposed to face each other in a direction perpendicular to the optical axis (the Z-axis).

The third magnet 8100 is disposed on the carrier 7300. For example, the third magnet 8100 may be disposed on one side of the carrier 7300.

One side of the carrier 7300 may be more protruded in the optical axis (Z-axis) direction than other portions of the carrier 7300. For example, the carrier 7300 may include a first guide portion 7310 protruding in the optical axis (Z-axis) direction, and a third magnet 8100 may be disposed on the first guide portion 7310. Accordingly, a height of the other portions of the carrier 7300 may be reduced, while an installation space of the second driving unit 8000 may be secured to secure driving force, so that a height of the second actuator 20' may be slimmed.

A back yoke may be disposed between the carrier 7300 and the third magnet 8100. The back yoke may improve driving force by preventing leakage of the magnetic flux of the third magnet 8100.

The third magnet 8100 may be magnetized so that one surface (e.g., a surface facing the third coil 8300) has both an N-pole and an S-pole. For example, an N-pole, a neutral region, and an S-pole may be sequentially provided on the one surface of the third magnet 8100 facing the third coil 8300 in the optical axis (Z-axis) direction.

The other surface (e.g., the opposite surface of the one surface) of the third magnet 8100 may be magnetized to have both an S-pole and an N-pole. For example, an S-pole, a neutral region, and an N-pole may be sequentially provided on the other surface of the third magnet 8100 in the optical axis (Z-axis) direction.

The third coil 8300 is disposed to face the third magnet 8100. For example, the third coil 8300 may be disposed to face the third magnet 8100 in a direction perpendicular to the optical axis (the Z-axis).

The third coil 8300 is disposed on a substrate 8900, and the substrate 8900 is mounted in the housing 6000 so that the third magnet 8100 and the third coil 8300 face each other in a direction perpendicular to the optical axis (the Z-axis).

One side of the housing 6000 may be more protruded in the optical axis (Z-axis) direction than the other portions of the housing 6000. For example, the housing 6000 may include a second guide portion 6330 protruding in the optical axis (Z-axis) direction, and the substrate 8900 may be mounted on the second guide portion 6330.

Figure 38:
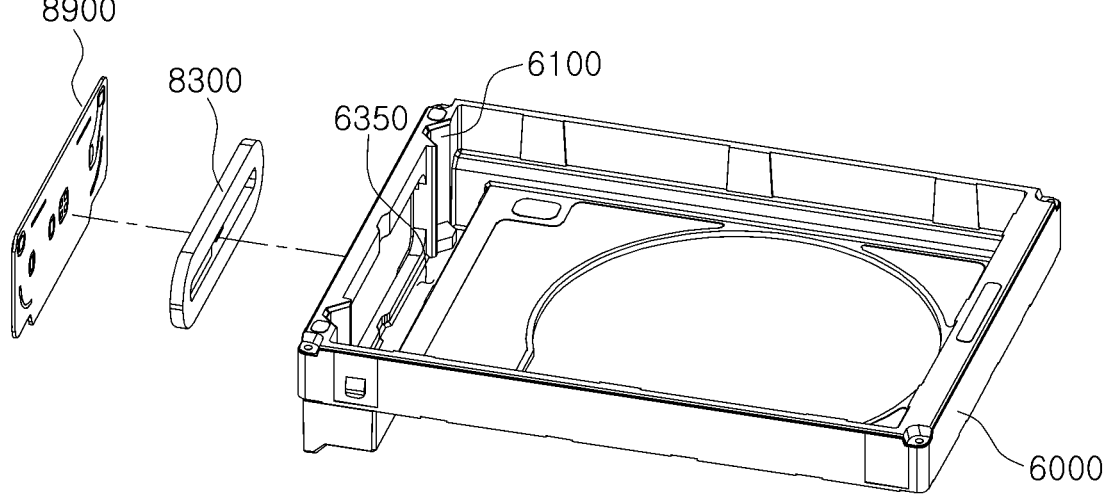
FIG. 38 is a perspective view of a housing of a second actuator according to another example embodiment in the present disclosure.

Also, as illustrated in FIG. 38, the second guide portion 6330 has an accommodating space 6350 for accommodating the first guide portion 7310.

Accordingly, a height of the other portions of the housing 6000 may be reduced, while an installation space of the second driving unit 8000 is secured to secure driving force, so that a height of the second actuator 20' may be slimmed.

The third magnet 8100 is a moving member mounted on the carrier 7300 and moving in the optical axis (Z-axis) direction together with the carrier 7300, and the third coil 8300 is a fixed member fixed to the substrate 8900.

When power is applied to the third coil 8300, the carrier 7300 may be moved in the optical axis (Z-axis) direction by electromagnetic force between the third magnet 8100 and the third coil 8300.

Since the lens barrel 7100 is disposed on the carrier 7300, the lens barrel 7100 is also moved in the optical axis (Z-axis) direction by the movement of the carrier 7300.

The second ball member B2 is disposed between the carrier 7300 and the housing 6000. For example, the second ball member B2 may be disposed between the first guide portion 7310 of the carrier 7300 and the second guide portion 6330 of the housing 6000. The second ball member B2 includes a plurality of balls arranged in the optical axis (Z-axis) direction. The plurality of balls may be rolled in the optical axis (Z-axis) direction when the carrier 7300 is moved in the optical axis (Z-axis) direction.

A yoke 8700 is disposed in the housing 6000. The yoke 8700 may be disposed at a position facing the third magnet 8100. For example, the third coil 8300 may be disposed on one surface of the substrate 8900, and the yoke 8700 may be disposed on the other surface of the substrate 8900.

The third magnet 8100 and the yoke 8700 may generate attractive force between each other. For example, attractive force acts between the third magnet 8100 and the yoke 8700 in a direction perpendicular to the optical axis (the Z-axis).

Due to the attractive force of the third magnet 8100 and the yoke 8700, the second ball member B2 may be in contact with each of the carrier 7300 and the housing 6000.

A guide recess may be disposed on surfaces of the carrier 7300 and the housing 6000 facing each other. For example, a third guide recess 7311 may be provided in the first guide portion 7310 of the carrier 7300, and a fourth guide recess 6100 may be provided in the second guide portion of the housing 6000.

The third guide recess 7311 and the fourth guide recess 6100 extend in the optical axis (Z-axis) direction. The second ball member B2 is disposed between the third guide recess 7311 and the fourth guide recess 6100.

Since the first guide portion 7310 of the carrier 7300 and the second guide portion 6330 of the housing 6000 protrude in the optical axis (Z-axis) direction, an escape region may be provided in the fixed frame 1000 and the moving frame 2000 of the first actuator 10' in order to secure an installation space for the first guide portion 7310 and the second guide portion 6330.

That is, as illustrated in FIG. 26, a step portion 1510 is provided on one side of the fixed frame 1000, and the fixed frame 1000 may have an accommodating space in which the first guide portion 7310 and the second guide portion 6330 may be disposed.

That is, the installation space of the first guide portion 7310 and the second guide portion 6330 may be secured by the step portion 1510.

Therefore, in the second actuator 20', even though the first guide portion 7310 of the carrier 7300 and the second guide portion 6330 of the housing 6000 protrude in the optical axis (Z-axis) direction, the protruding portion is disposed within the first actuator 10', and as a result, a height of the overall camera module 1' may not be increased.

Meanwhile, the second actuator 20' may detect a position of the carrier 7300 in the optical axis (Z-axis) direction.

To this end, a third position sensor 8500 is provided. The third position sensor 8500 is disposed on the substrate 8900 to face the third magnet 8100. The third position sensor 8500 may be a Hall sensor.

Meanwhile, the configuration of the main guide, the auxiliary guide, the number of the second ball member B2, the support region and the auxiliary yoke described above with reference to FIGS. 17 through 23 may also be applied to the camera module 1' according to another example embodiment in the present disclosure.

In the camera module 1' according to another example embodiment in the present disclosure, the lens module 7000 is configured to be moved in the optical axis (Z-axis) direction during AF adjustment, and the image sensor S is configured to be moved in a direction perpendicular to the optical axis (the Z-axis) during OIS.

Therefore, even if the lens module 7000 is moved in the optical axis (Z-axis) direction during focus adjustment, the relative positions of the magnets and the coils of the first driving unit 3000 do not change, and thus, the driving force for OIS may be precisely controlled.

In addition, even when the image sensor S is moved in a direction perpendicular to the optical axis during OIS, the relative positions of the magnet and the coil of the second driving unit 8000 do not change, and thus, driving force for focus adjustment may be precisely controlled.

The actuator for OIS and the camera module including the same according to an example embodiment in the present disclosure may improve OIS performance.

The detectors, modules, processors, sensors, camera module 1, 1', first driving unit 300, 3000, first sub driving unit 310, 3100, second sub driving unit 330, 3300, first actuator 10, 10', second actuator 20, 20', first position sensor 315, 3150, second position sensor 335, 3350, image sensor S, damping unit 170, second driving unit 800, 8000, third position sensor 850, 8500, driver integrated circuit (IC) C3, and other apparatuses, devices, units, modules, and components described herein with respect to FIGS. 1-38 are implemented by or representative of hardware components. Examples of hardware components that may be used to perform the operations described herein where appropriate include controllers, sensors, generators, drivers, memories, comparators, arithmetic logic units, adders, subtractors, multipliers, dividers, integrators, and any other electronic components configured to perform the operations described herein. In other examples, one or more of the hardware components that perform the operations described herein are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described herein. The hardware components may also access, manipulate, process, create, and store data in response to execution of the instructions or software. For simplicity, the singular term "processor" or "computer" may be used in the description of the examples described herein, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-38 that perform the operations described herein are performed by computing hardware, for example, by one or more processors or computers, implemented as described above executing instructions or software to perform the operations described herein that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical image stabilization actuator, comprising:
a fixed frame having an internal space;
a moving frame accommodated in the fixed frame and being movable relative to the fixed frame;
a first ball member disposed between the fixed frame and the moving frame;
a first driving unit comprising a plurality of magnets disposed in the fixed frame and a plurality of coils disposed in the moving frame and moved together with the moving frame;
a sensor substrate partially coupled to the moving frame to move together with the moving frame;
a plurality of yokes disposed in the moving frame and generating attractive force with respect to the plurality of magnets; and
an image sensor disposed in a portion of the sensor substrate,
wherein the moving frame comprises a first frame in which the plurality of coils are disposed and a second frame in which the first ball member is disposed, and
wherein a wiring pattern is disposed inside of the first frame and inside the second frame, a portion of the wiring pattern is exposed to the outside of the first frame, and another portion of the wiring pattern is exposed to the outside of the second frame.

2. The actuator of claim 1, wherein other portions of the sensor substrate are coupled to the fixed frame.

3. The actuator of claim 1, wherein the first frame and the second frame are formed of a plastic material.

4. The actuator of claim 1, wherein another portion of the wiring pattern is exposed to the outside of the second frame and connected to the sensor substrate.

5. The actuator of claim 1, wherein the plurality of yokes face the plurality of magnets, and at least a portion of each of the plurality of yokes is disposed inside of the first frame.

6. The actuator of claim 1, wherein a support pad is disposed inside of the second frame, and one surface of the support pad is exposed to the outside of the second frame to contact the first ball member.

7. The actuator of claim 6, wherein the second frame is formed of a plastic material, and the support pad is formed of a non-magnetic metal material.

8. The actuator of claim 1, wherein
the sensor substrate comprises a moving portion, on which the image sensor is disposed, coupled to the moving frame, a fixed portion coupled to the fixed frame, and a connection portion connecting the moving portion and the fixed portion, and
the connection portion is extended along a circumference of the moving portion.

9. The actuator of claim 8, wherein the connection portion comprises a plurality of bridge elements spaced apart from each other, and each bridge element has a width less than a thickness thereof.

10. The actuator of claim 8, wherein
the connection portion comprises a first support portion and a second support portion,
the first support portion has one side connected to the moving portion and the other side spaced apart from the fixed portion, and
the second support portion has one side connected to the fixed portion and the other side spaced apart from the moving portion.

11. The actuator of claim 1, wherein
the moving frame comprises a plurality of damping recesses, the fixed frame comprises a plurality of damping pins extending toward the plurality of damping recesses, and
a damping gel is disposed in the plurality of damping recesses, and at least a portion of the plurality of damping pins is inserted into the damping gel.

12. A camera module comprising:
the actuator of claim 1; and
a lens module accommodated in an internal space of a housing and disposed to be movable in an optical axis direction,
wherein the housing is disposed on the fixed frame.

13. A camera module comprising:
a housing having an internal space;
a lens module accommodated in the internal space and disposed to be movable in an optical axis direction;
a fixed frame fixedly disposed on the housing;
a moving frame movable in a direction perpendicular to the optical axis direction, relative to the fixed frame;
a first ball member disposed between the fixed frame and the moving frame;
a first driving unit comprising a plurality of magnets disposed in the fixed frame and a plurality of coils disposed in the moving frame and moved together with the moving frame; and
a sensor substrate, on which an image sensor is disposed, having a moving portion coupled to the moving frame,
wherein the plurality of coils and the sensor substrate are electrically connected by a wiring pattern disposed inside of the moving frame,
wherein the moving frame comprises a first frame in which the plurality of coils are disposed and a second frame in which the first ball member is disposed, and
wherein a wiring pattern is disposed inside of the first frame and inside the second frame, a portion of the wiring pattern is exposed to the outside of the first frame, and another portion of the wiring pattern is exposed to the outside of the second frame.

14. The camera module of claim 13, wherein the sensor substrate comprises a fixed portion coupled to the fixed frame.

15. The camera module of claim 13, wherein
the wiring pattern comprises a wiring portion connected to the plurality of coils and a terminal portion connected to the sensor substrate,
a portion of the wiring portion is exposed to an upper surface of the moving frame, and the rest of the wiring portion is disposed inside of the moving frame, and
the terminal portion is exposed to a lower surface of the moving frame.

16. The camera module of claim 13, wherein the lens module comprises a first guide portion protruding in the optical axis direction, the housing comprises a second guide portion protruding in the optical axis direction and accommodating the first guide portion, and a second ball member is disposed between surfaces of the first guide portion and the second guide portion facing in a direction perpendicular to the optical axis direction.

17. The camera module of claim 16, wherein the fixed frame comprises a step portion in which the second guide portion is disposed.

18. The camera module of claim 13, wherein the moving frame comprises a plurality of damping recesses, the fixed frame comprises a plurality of damping pins extending toward the plurality of damping recesses, and a damping gel is disposed in the plurality of damping recesses, and at least a portion of the plurality of damping pins is inserted into the damping gel.

19. An optical image stabilization actuator, comprising:

a fixed frame open from top to bottom;

an image sensor receiving incident light through the fixed frame, and disposed in a moving frame being movable relative to the fixed frame in a first direction parallel to the plane of the image sensor and a second direction perpendicular to the first direction;

magnets disposed on the fixed frame extending in the first direction and the second direction;

coils disposed in the moving frame facing the magnets to drive the moving frame in the first and second directions, wherein the moving frame is disposed on a first ball member disposed between the moving frame and the fixed frame, wherein the moving frame comprises a first frame in which the plurality of coils are disposed and a second frame in which the first ball member is disposed, and wherein a wiring pattern is disposed inside of the first frame and inside the second frame, a portion of the wiring pattern is exposed to the outside of the first frame, and another portion of the wiring pattern is exposed to the outside of the second frame.

20. The actuator of claim 19, wherein the coils disposed in the moving frame facing the magnets rotate the moving frame about a direction the image sensor faces.

21. The actuator of claim 19, wherein the image sensor is disposed on a sensor substrate, and wherein the sensor substrate comprises a moving portion, on which the image sensor is disposed, coupled to the moving frame, a fixed portion coupled to the fixed frame, and a connection portion connecting the moving portion and the fixed portion.

22. The actuator of claim 19, further comprising yokes disposed in the moving frame and generating attractive force with respect to the magnets.

23. A camera module comprising:

the actuator of claim 19;

a sensor substrate comprising a moving portion, on which the image sensor is disposed, coupled to the moving frame, a fixed portion coupled to the fixed frame, and a connection portion connecting the moving portion and the fixed portion; and a lens module accommodated in an internal space of a housing and disposed to be movable in an optical axis direction to focus the incident light on the image sensor, wherein the housing is disposed on the fixed frame, and wherein the coils and the sensor substrate are electrically connected by a wiring pattern disposed inside of the moving frame.

24. The actuator of claim 1, wherein a wiring pattern is disposed inside of the moving frame, and a portion of the wiring pattern is connected to the plurality of coils.

25. The actuator of claim 1, wherein the first driving unit comprises a first sub-driving unit generating driving force in a first axis direction parallel to an imaging surface of the image sensor and a second sub-driving unit generating driving force in a second axis direction perpendicular to the first axis direction, the first sub-driving unit comprises a first magnet disposed in the fixed frame and a first coil disposed in the moving frame, and the second sub-driving unit comprises a second magnet disposed in the fixed frame and a second coil disposed in the moving frame.

26. The actuator of claim 25, wherein one or more of the first magnet and the second magnet includes two magnets, one or more of the first coil and the second coil includes two coils, and two position sensors are disposed at positions facing the two magnets.

\*　\*　\*　\*　\*